US011988035B2

(12) United States Patent
Hartford et al.

(10) Patent No.: US 11,988,035 B2
(45) **Date of Patent: *May 21, 2024**

(54) PRESS-FIT WINDOW INSERT

(71) Applicant: R Value, Inc., Portland, OR (US)

(72) Inventors: Timothy James Hartford, Oregon City, OR (US); Mark Pratt, Portland, OR (US); Samuel Pardue, Portland, OR (US)

(73) Assignee: R VALUE, INC., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,731

(22) Filed: Mar. 31, 2023

(65) Prior Publication Data

US 2023/0235615 A1 Jul. 27, 2023

Related U.S. Application Data

(63) Continuation of application No. 17/398,832, filed on Aug. 10, 2021, now Pat. No. 11,639,627.

(Continued)

(51) Int. Cl.
*E06B 3/30* (2006.01)
*E06B 3/58* (2006.01)
*E06B 7/23* (2006.01)

(52) U.S. Cl.
CPC ............ *E06B 3/303* (2013.01); *E06B 3/5857* (2013.01); *E06B 7/231* (2013.01)

(58) Field of Classification Search
CPC . E06B 3/28; E06B 3/285; E06B 3/302; E06B 3/303; E06B 3/58; E06B 3/5821;

(Continued)

(56) References Cited

U.S. PATENT DOCUMENTS 2,578,470 A * 12/1951 Gorell ........................ E06B 7/22 52/204.597
2,612,947 A * 10/1952 Jenks ........................ E06B 3/28 160/354

(Continued)

FOREIGN PATENT DOCUMENTS

CN 200961400 Y 10/2007
DE 3103548 A1 * 8/1982

(Continued)

OTHER PUBLICATIONS

Brush Pile Seals to ('SchlegelGiesse') Mar. 31, 2020 (Mar. 31, 2020). Entire document, especially p. 8;https://www.schlegelgiesse.com/wp-content/uploads/2020/03/U0870001-schlegel-poly-bond-brochure-2019-en-lr.pdf.

(Continued)

*Primary Examiner* — Ryan D Kwiecinski
(74) *Attorney, Agent, or Firm* — Miller Nash LLP

(57) ABSTRACT

A press-fit window insert configured to provide secondary protection to an existing window, having a carrier, a fin, and a fastening clip. The carrier includes a substantially rigid framework having channels within the framework configured to securely accept one or more attachments. The fin extends from the carrier and includes a substantially flexible blade extending from a base portion of the fin. The base portion of the fin is configured to interlock the fin to the carrier. The fastening clip includes a substantially rigid brim extending from a base portion of the fastening clip. The base portion of the fastening clip is configured to interlock the fastening clip to the carrier.

20 Claims, 16 Drawing Sheets

Related U.S. Application Data

(60) Provisional application No. 63/063,866, filed on Aug. 10, 2020.

(58) Field of Classification Search
CPC .... E06B 3/5857; E06B 3/5885; E06B 3/9682; E06B 5/10; E06B 7/2305; E06B 7/2307; E06B 7/231; E06B 9/02; E06B 2009/005
See application file for complete search history.

(56) References Cited

U.S. PATENT DOCUMENTS

| | | | | | |
|---|---|---|---|---|---|
| 4,160,348 | A * | 7/1979 | Chapman | E06B 3/4609 160/354 |
| 4,364,209 | A | 12/1982 | Gebhard | |
| 5,735,089 | A | 4/1998 | Smith et al. | |
| 5,737,885 | A * | 4/1998 | Stoyke | E06B 3/28 52/202 |
| 6,089,300 | A | 7/2000 | Woodside et al. | |
| 7,568,316 | B2 * | 8/2009 | Choby | B61D 25/00 52/204.593 |
| 8,966,839 | B2 * | 3/2015 | Rebman | E06B 3/263 52/203 |
| 9,097,058 | B2 * | 8/2015 | Saucier | B60J 1/006 |
| 9,512,666 | B2 * | 12/2016 | Reyher | E06B 3/6715 |
| 2004/0128924 | A1 | 7/2004 | Kobrehel et al. | |
| 2012/0317910 | A1 | 12/2012 | Esposito | |
| 2013/0042551 | A1 * | 2/2013 | Koutsoukos | E06B 9/02 52/698 |
| 2017/0268282 | A1 * | 9/2017 | Bacon | E06B 3/9684 |

FOREIGN PATENT DOCUMENTS

| | | | | | |
|---|---|---|---|---|---|
| DE | 102017101003 | A1 * | 7/2017 | |
| DE | 102017101003 | A1 | 7/2017 | |
| EP | 1724429 | A1 * | 11/2006 | E06B 3/28 |
| EP | 1724429 | A1 | 11/2006 | |
| FR | 2381888 | | 9/1978 | |
| FR | 2381888 | A * | 10/1978 | E06B 3/28 |
| GB | 2467649 | A * | 8/2010 | E06B 3/5821 |
| GB | 2467649 | A | 8/2010 | |

OTHER PUBLICATIONS

International Search Report and Written Opinion of the International Searching Authority issued in International Application No. PCT/US2021/045449, dated Dec. 28, 2021, 13 pages.

* cited by examiner

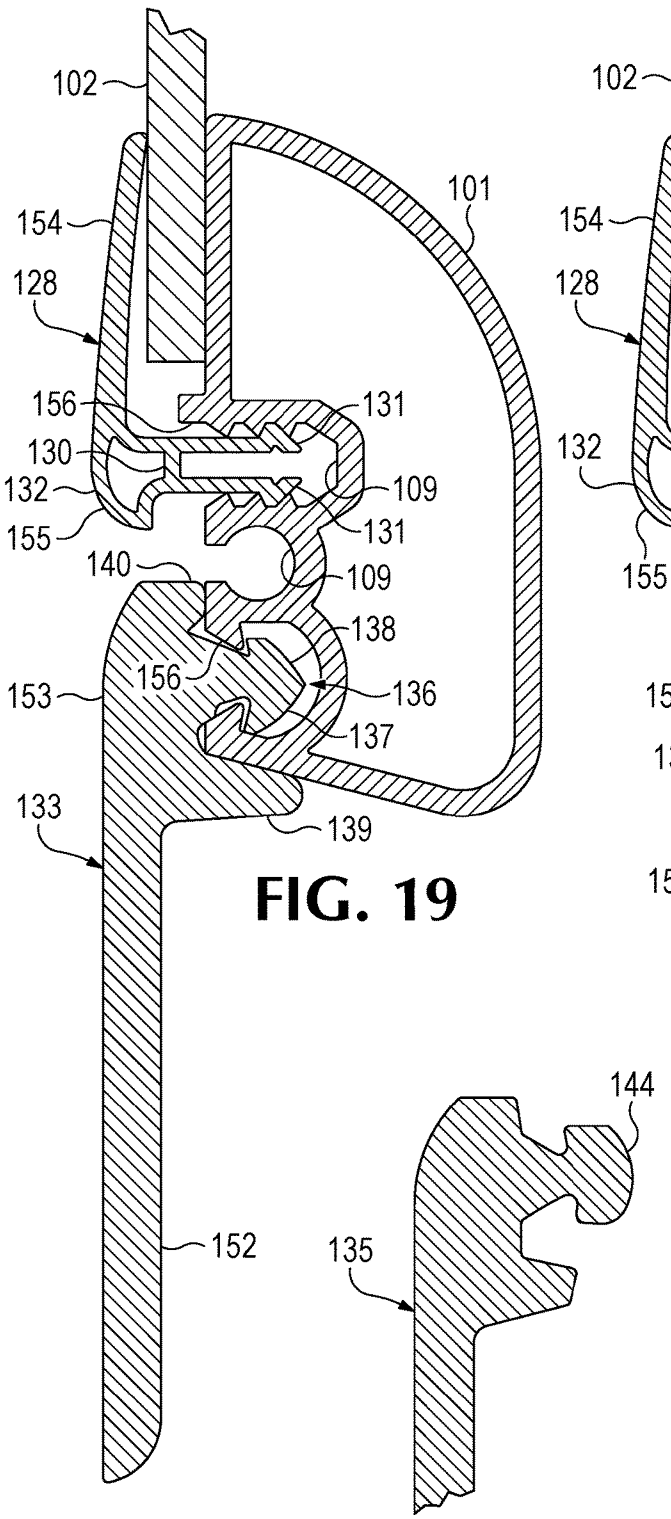
FIG. 19
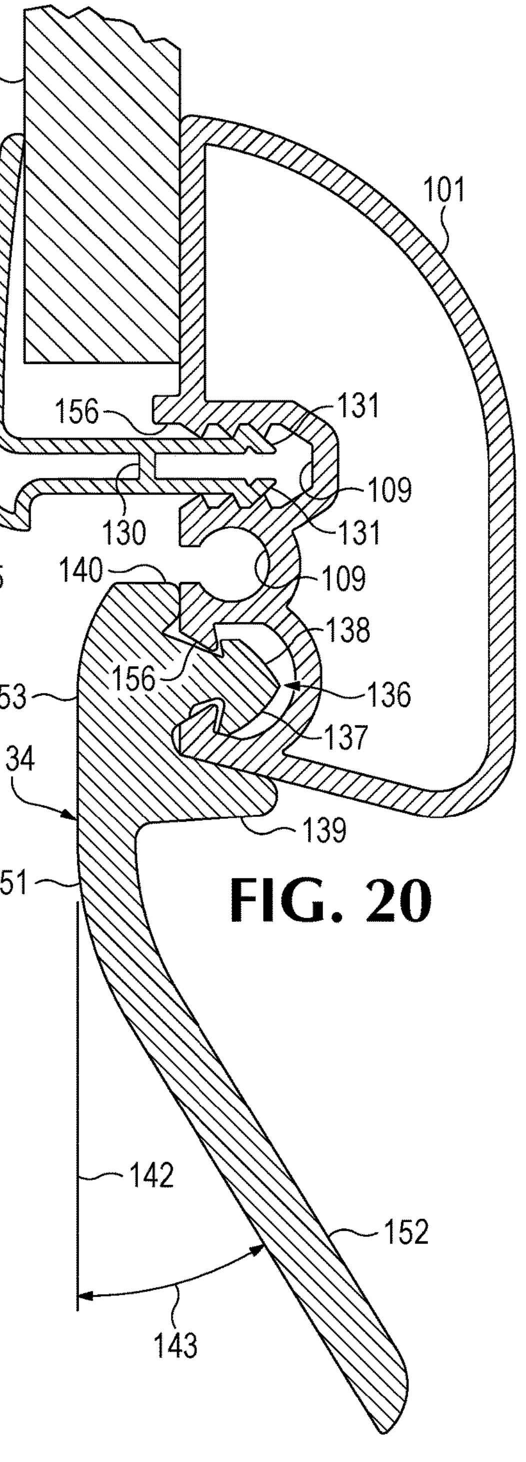
FIG. 20
FIG. 21

PRESS-FIT WINDOW INSERT

CROSS-REFERENCES TO RELATED APPLICATIONS

This patent application is a continuation of U.S. non-provisional patent application Ser. No. 17/398,832, filed Aug. 10, 2021, which claims the benefit of U.S. provisional patent application No. 63/063,866 filed Aug. 10, 2020, the disclosures of both of which are incorporated herein by reference in their entireties.

TECHNICAL FIELD

The subject matter is related to a system and methods for a press-fit window insert to provide secondary protection to an existing primary window.

BACKGROUND

Storm windows are generally mounted on the outside or inside of main windows of a home or business. They are oftentimes used in cold climates to reduce energy leakage from the windows, for instance, cold air leaking into a house through the main windows. Storm windows are generally made from glass, plastic, or other transparent material. In some instances storm windows may be translucent or opaque.

Many previous storm window systems are difficult to install and remove. Generally previous storm window systems are mechanically attached with mounting hardware to either the inside or outside of the main window. The windows may be heavy and difficult to manipulate. Other, less expensive systems use see-through plastic sheets that are taped or attached to window casings. Sometimes the plastic sheets may be shrunk using a heat gun which, when directed at the plastic sheet, causes the sheet to contract, making the sheet taught, and easier to see through. Such prior art systems are, similar to the mechanical systems as described above, difficult and time-consuming to install.

Configurations of the disclosed technology address shortcomings in the prior art.

BRIEF DESCRIPTION OF THE DRAWINGS

FIG. 19 is a sectional view as defined in FIG. 15.

FIG. 20 is a sectional view similar to FIG. 19 but showing alternative configurations.

FIG. 21 is a sectional view of a portion of an alternative fin according to configurations.

DETAILED DESCRIPTION

As described herein, configurations are directed to a press-fit window insert that may be installed in an existing window frame to provide secondary protection to the existing primary window. The secondary protection may include, for example, thermal insulation, sound insulation, and blocking or diffusing of light.

Previously existing technology requires very precise measurements to ensure a proper fit to the existing window frame. Indeed, such measurements are often performed with a laser-based measuring device to obtain the necessary accuracy of within 1/16 inch of the actual measurement. By contrast, configurations of the technology disclosed here allow for a much less precise tape measurement—allowing measurements to deviate as much as 1/4 inch from the window frame's actual span—while still providing a proper fit with the existing window frame, even on window frames that may be out of square.

Previously existing technology also requires very precise diagonal measurements of the inside of the window frame. Such measurements are used to enable the manufacture of a compression-fit window insert that is the same trapezoidal shape of the inside of the window frame. By contrast, configurations of the technology disclosed here allow the window insert to be manufactured as a rectangle, such that the compression system absorbs the out-of-squareness of the window frame.

In addition, in previously existing technology, it can be difficult to seal the corners of a window insert, where the sealing material from one edge of the window insert meets the sealing material from another edge of the window insert at an angle. At such junctures, the sealing materials from the converging edges often bunch or leave gaps, or both, and prevent sufficient sealing at the corners. By contrast, configurations of the technology disclosed here utilize a corner flap, or leaf, to sufficiently seal the corners.

Figure 1:
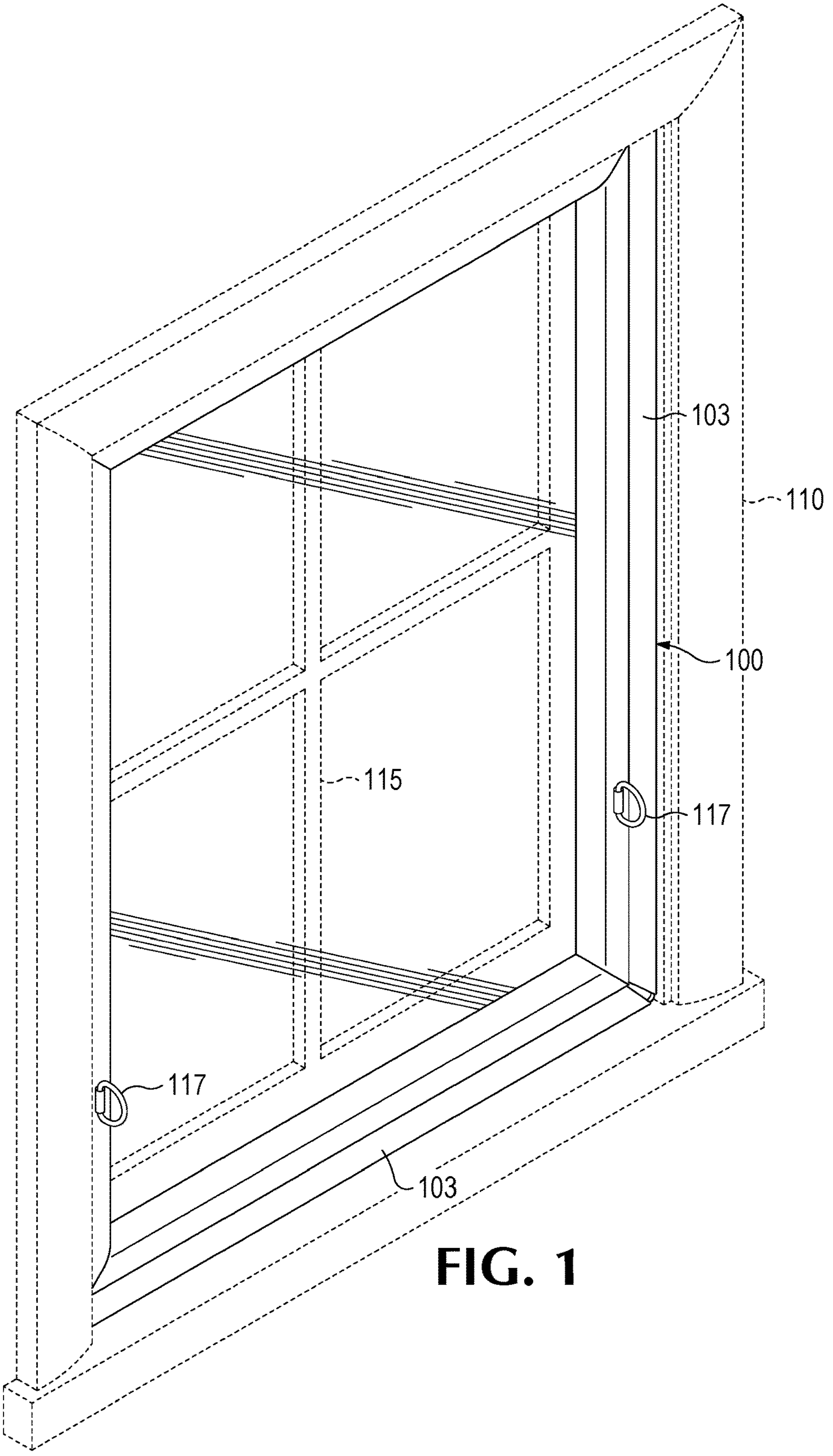
FIG. 1 is a first-side, isometric view showing a press-fit window insert according to configurations, shown installed in a window frame.
Figure 2:
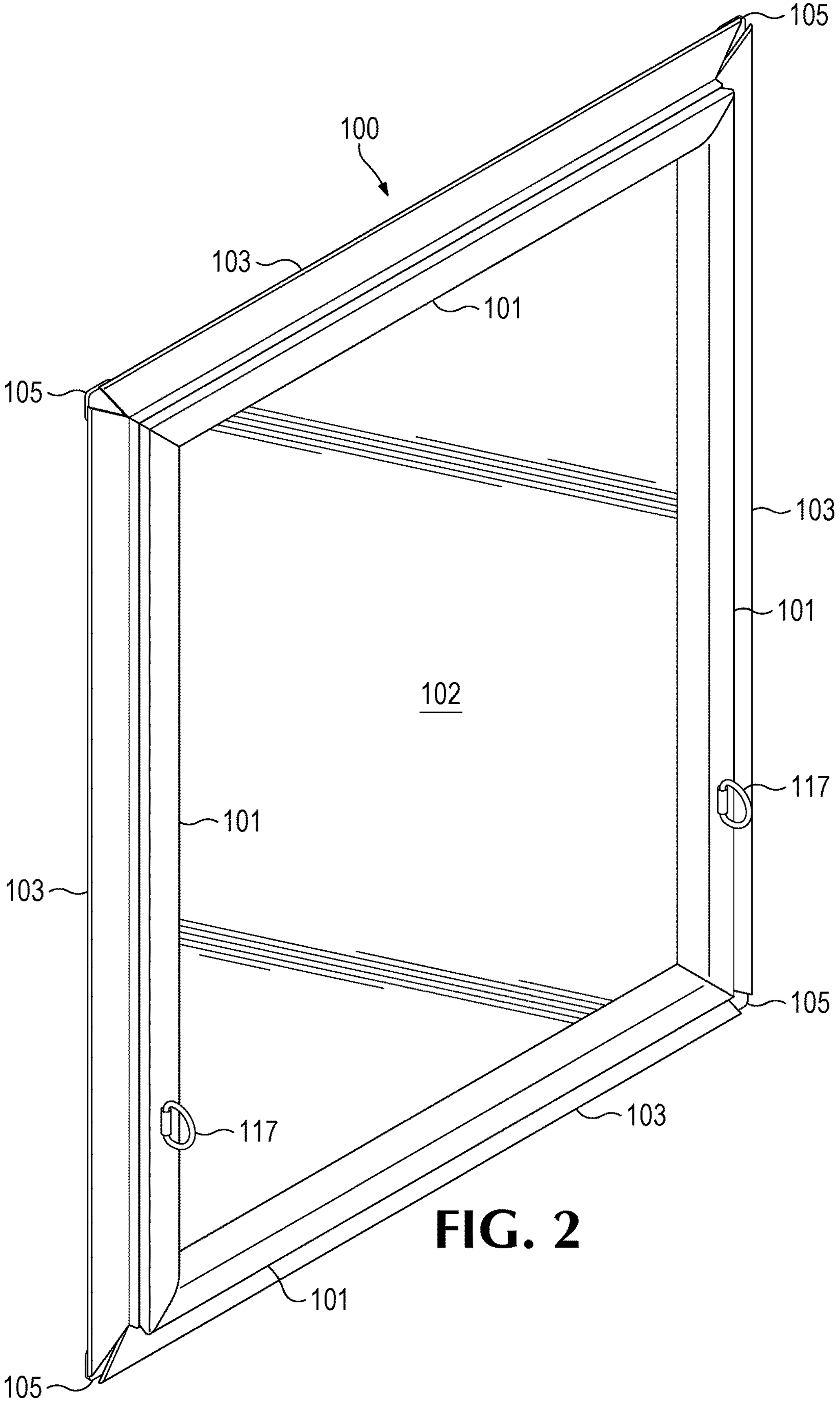
FIG. 2 is a first-side, isometric view of the press-fit window insert of FIG. 1, shown not installed in a window frame.
Figure 3:
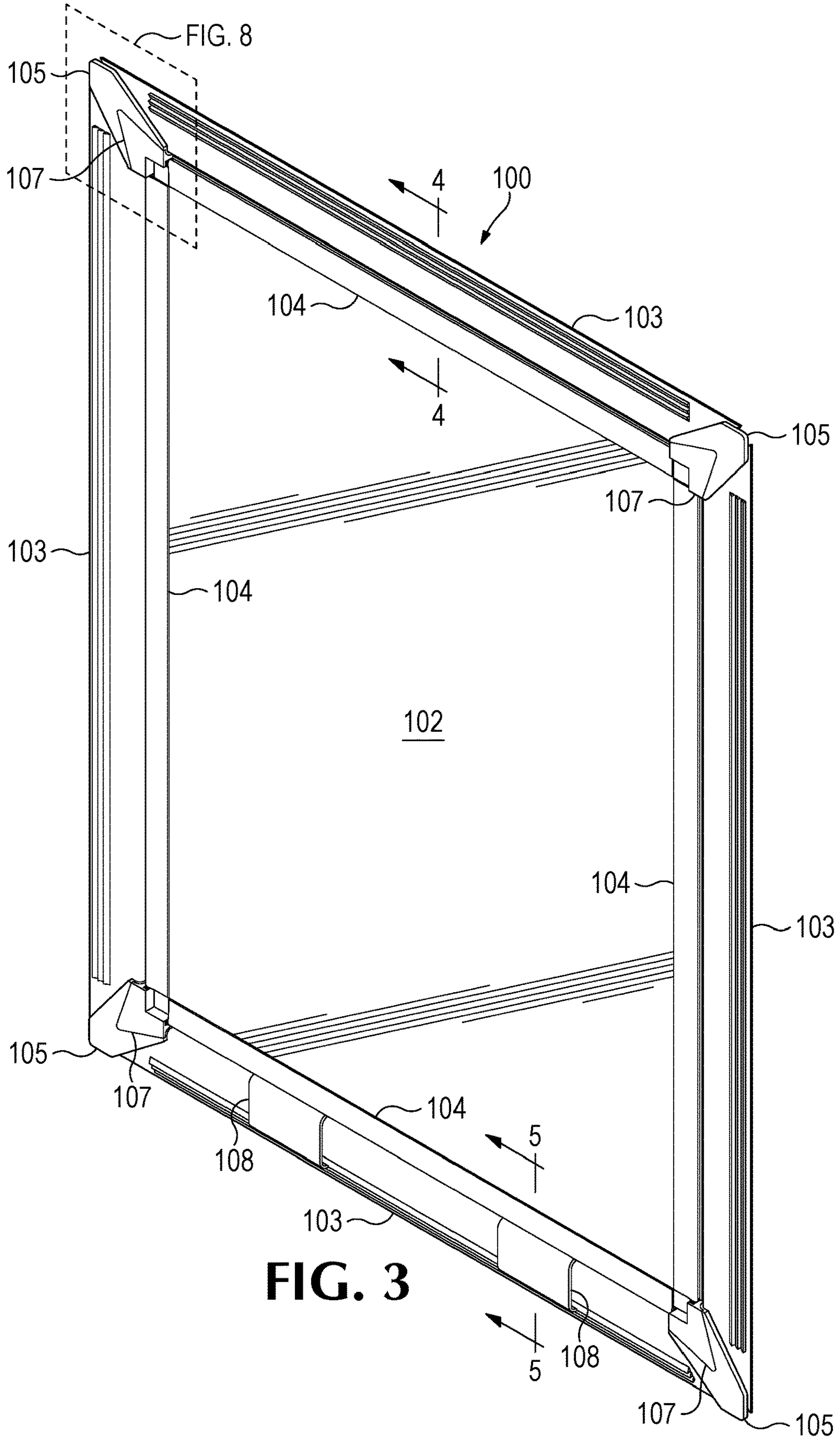
FIG. 3 is a second-side, isometric view of the press-fit window insert of FIG. 2. The second side is opposite the first side of the press-fit window insert.

As illustrated in FIG. 1, a press-fit window insert 100, according to configurations described here, may be installed in an existing window frame 110 adjacent an existing primary window 115. The press-fit window insert 100 may include one or more handles or tabs, such as the pull-rings 117 illustrated in FIGS. 1-2, to facilitate removal of the press-fit window insert 100 from the window frame 110.

With particular reference to FIGS. 1-5, 8, 10-12, and 14, the press-fit window insert 100 may include a carrier 101, a panel 102, a fin 103, a fastening clip 104, a leaf 105, a corner piece 106, a corner snap 107, and a base support 108.

Figure 4:
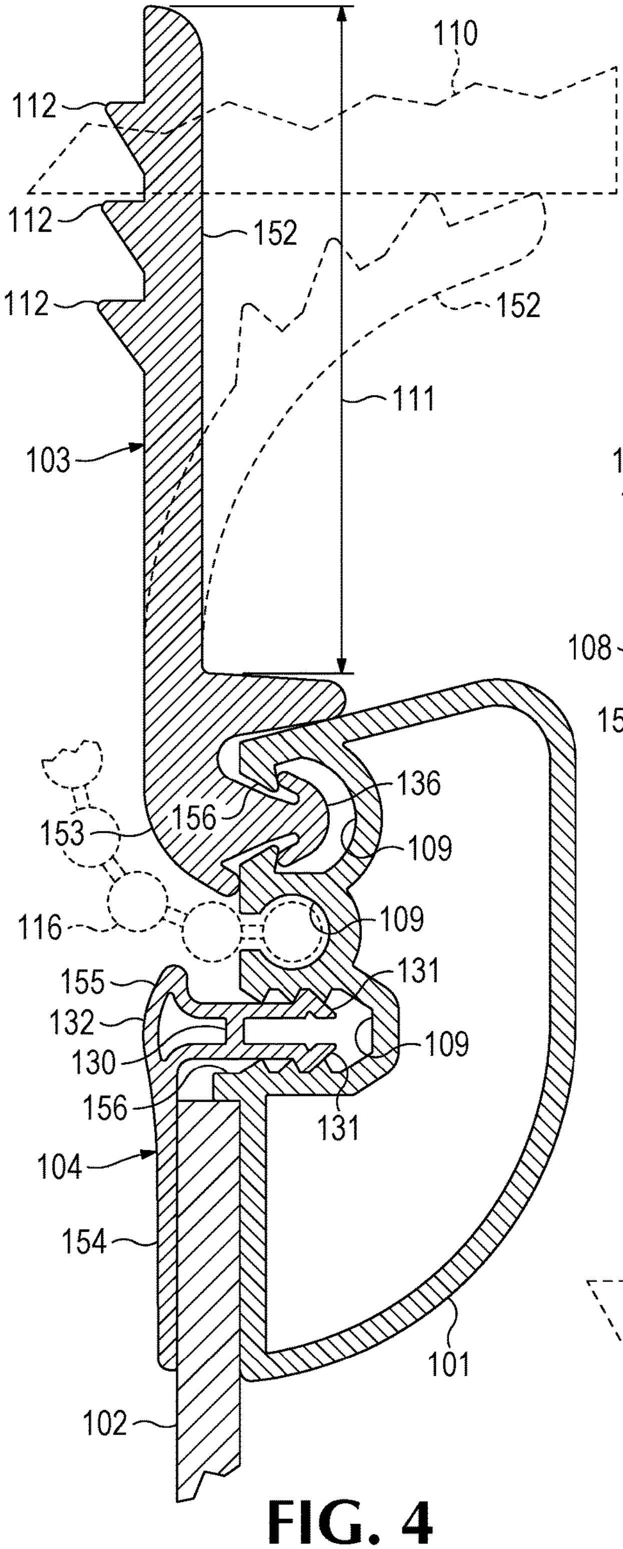
FIG. 4 is a cross-section of a portion of the press-fit window insert, the cross-section being defined in FIG. 3.
Figure 5:
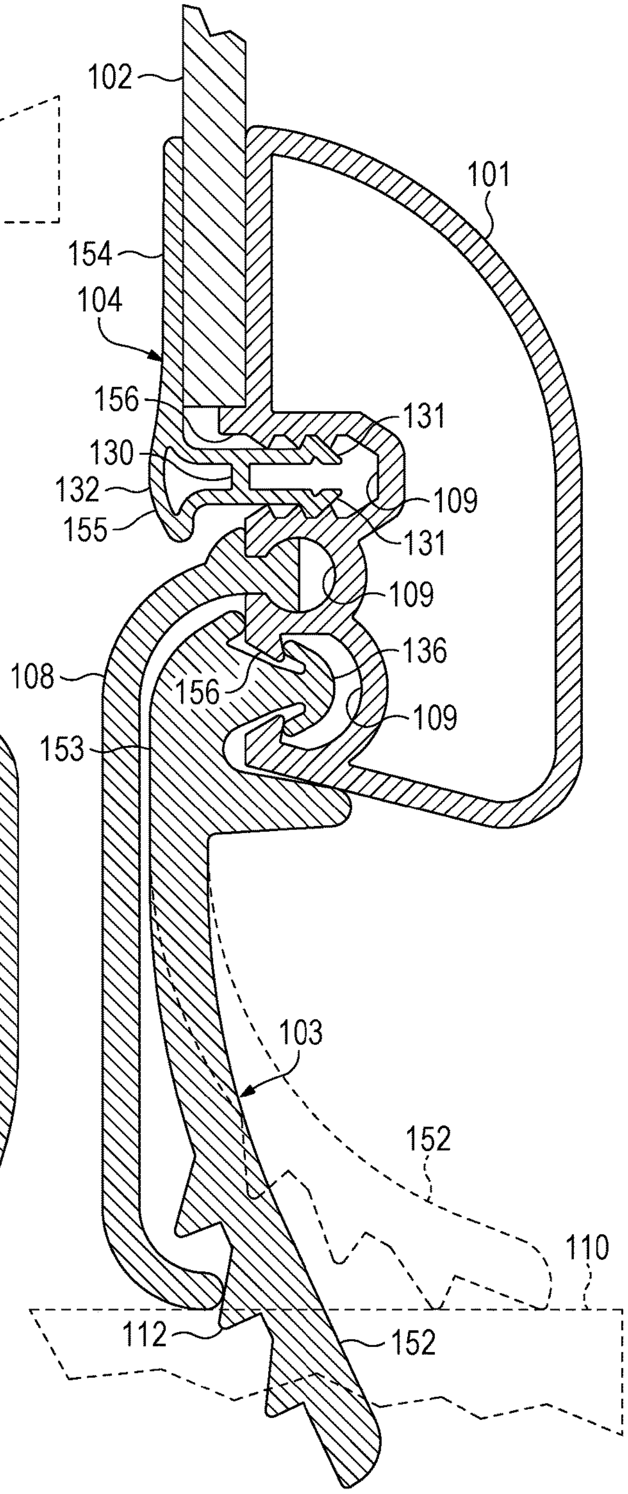
FIG. 5 is a cross-section of another portion of the press-fit window insert, the cross-section being defined in FIG. 3.

The carrier 101 is shaped and configured to secure the panel 102, the fin 103, and the fastening clip 104 and to provide rigidity to the press-fit window insert 100. As illustrated, the carrier 101 comprises a substantially rigid and elongated framework. As used in this disclosure, "substantially rigid" means largely or essentially stiff and not pliant, without requiring perfect inflexibility. The framework is described here as being elongated because the example cross sections (such as those illustrated in FIGS. 4-5) are largely maintained over the length of the carrier 101. For example, the carrier 101 may be formed by extrusion methods. With particular reference to FIGS. 4-5, the carrier 101 may include multiple channels 109 within the framework. The multiple channels 109 are configured to accept and secure one or more attachments such as, for example, one or more of the fin 103, the fastening clip 104, and the base support 108. As illustrated in FIGS. 4-5, the fin 103, the fastening clip 104, and the base support 108 may each be shaped and dimensioned to interlock with the carrier 101, allowing those components to be attached to the carrier 101 without glue or another adhesive. The carrier 101 may be made from, for example, extruded metal, such as aluminum, or acrylonitrile butadiene styrene (ABS) plastic.

The panel 102 may be made from, for example, glass, polycarbonate, acrylic, medium density fiberboard, film, screen, laminated glass, a laminate layer with no glass, or other materials commonly found in residential and commercial windows.

The fin 103 is shaped and configured to extend between the carrier 101 and a window frame 110, thus providing an air seal. (See, in particular, FIGS. 4-5.) The fin 103 includes a substantially flexible blade 152 extending from a base portion 153 of the fin 103. As used in this disclosure, "substantially flexible" means largely or essentially pliable, without requiring perfect pliability. The base portion 153 of the fin 103 is configured to interlock the fin 103 to the carrier 101. For example, the fin 103 may include an arrowhead tip 136, or barb, configured to extend into one of the multiple channels 109 of the carrier 101 to interlock the fin 103 to the carrier 101. In configurations, the arrowhead tip 136 may be inserted in the channel 109 through a slot 156 in the carrier 101. In configurations, the arrowhead tip 136 is shaped to allow it to be readily inserted into the channel 109 through the slot 156 but to be more difficult to remove. As illustrated in the drawings, the slot 156 is narrower than the channel 109. In configurations, the arrowhead tip 136 is enlarged such that it cannot be pressed into the slot 156 under thumb pressure from a human user. Instead, the enlarged arrowhead tip 136 may be slid into the carrier 101 through an open end of the channel 109. Another example of this is described below for FIG. 21.

The fin 103 may be made from, for example, silicone or another resilient elastomer. Being flexible, the fin 103 is shaped and configured to deflect when the press-fit window insert 100 is installed into the window frame 110. An example of this deflection is illustrated in FIGS. 4-5. As a result of the elastic deflection, the fin 103 is shaped and configured to impart a force to the window frame 110, the force tending to keep the press-fit window insert 100 installed into the window frame 110.

Preferably, the fin 103 has a length 111 between about 1 inch and about 2 inches. More preferably, the fin length 111 is between about 1¼ inches and about 1½ inches. Even more preferably, the fin length 111 is about 1⅜ inches. These numbers, and in particular the fin length 111 of about 1⅜ inches, were developed by analyzing R Value, Inc.'s database of thousands of laser measurements of existing window frames. These fin length 111 ranges, and in particular the fin length 111 of about 1⅜ inches, are important for allowing the press-fit window insert 100 to absorb the majority of the out-of-square measurements identified in the database of laser measurements of window frames, plus up to about ⅛ inch of measurement error on each side of the press-fit window insert 100 for a total of about ¼ inch total across the width and about ¼ inch total across the height of the press-fit window insert 100.

Preferably, the fin 103 has a thickness between about 0.040 inch and about 0.200 inches. More preferably, the fin thickness is between about 0.080 inches and about 0.160 inches. Even more preferably, the fin thickness is about 0.120 inches.

Preferably, the fin 103 has a Shore A hardness between about 20 and about 100. More preferably, the fin Shore A hardness is between about 40 and about 80. Even more preferably, the fin Shore A hardness is about 60.

The fin 103 may include one or more ribs 112 shaped and configured to contact the window frame 110. The one or more ribs 112, by frictionally engaging the window frame 110, may increase the amount of force needed to remove the press-fit window insert 100 from the window frame 110.

The fastening clip 104 is shaped and configured to pinch an edge of the panel 102 against the carrier 101. As illustrated, the fastening clip 104 includes a substantially rigid brim 154 extending from a base portion 155 of the fastening clip 104. As used in this disclosure, "substantially rigid" means largely or essentially stiff and not pliant, without requiring perfect inflexibility. The base portion 155 of the fastening clip 104 is configured to interlock the fastening clip 104 to the carrier 101. In configurations, the combination of the fastening clip 104 and the carrier 101 may accommodate a panel width of up to about ⅜ inch thick. In configurations, the fastening clip 104 can be different sizes to accommodate panels 102 of different thicknesses. For example, in configurations the fastening clip 104 may be shaped and configured to accommodate a panel width from about 0.7 mil (such as for a film panel) to about ⅛ inch (such as for an acrylic panel). As another example, the fastening clip 104 may be shaped and configured to accommodate a panel width from about ⅛ inch to about ⅜ inch. As yet another example, the fastening clip 104 may be shaped and configured to accommodate a panel width from about ¼ inch to about ½ inch. In configurations, the fastening clip 104 is shaped and configured to provide sufficient space for the panel 102 to thermally expand and contract without either binding or falling out of the window frame 110.

Figure 8:
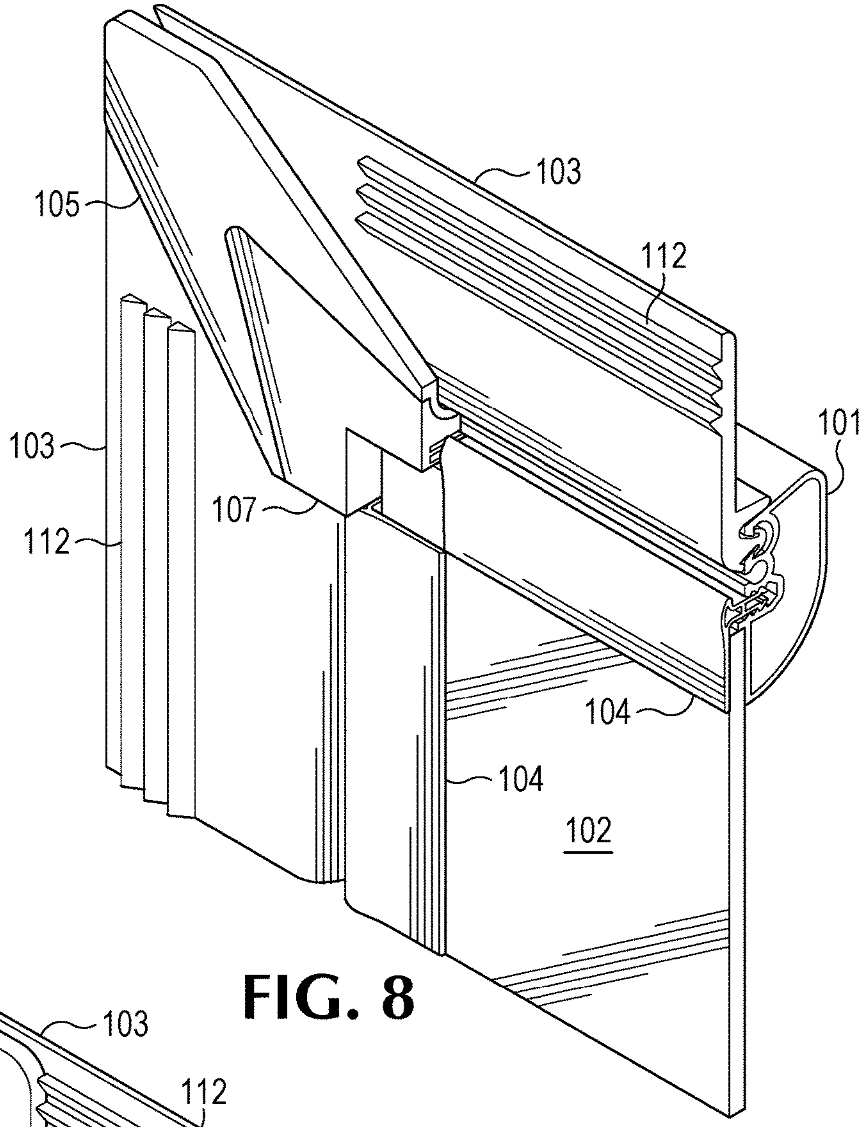
FIG. 8 is a detailed view of a corner of the press-fit window insert, the detailed view being defined in FIG. 3.
Figure 10:
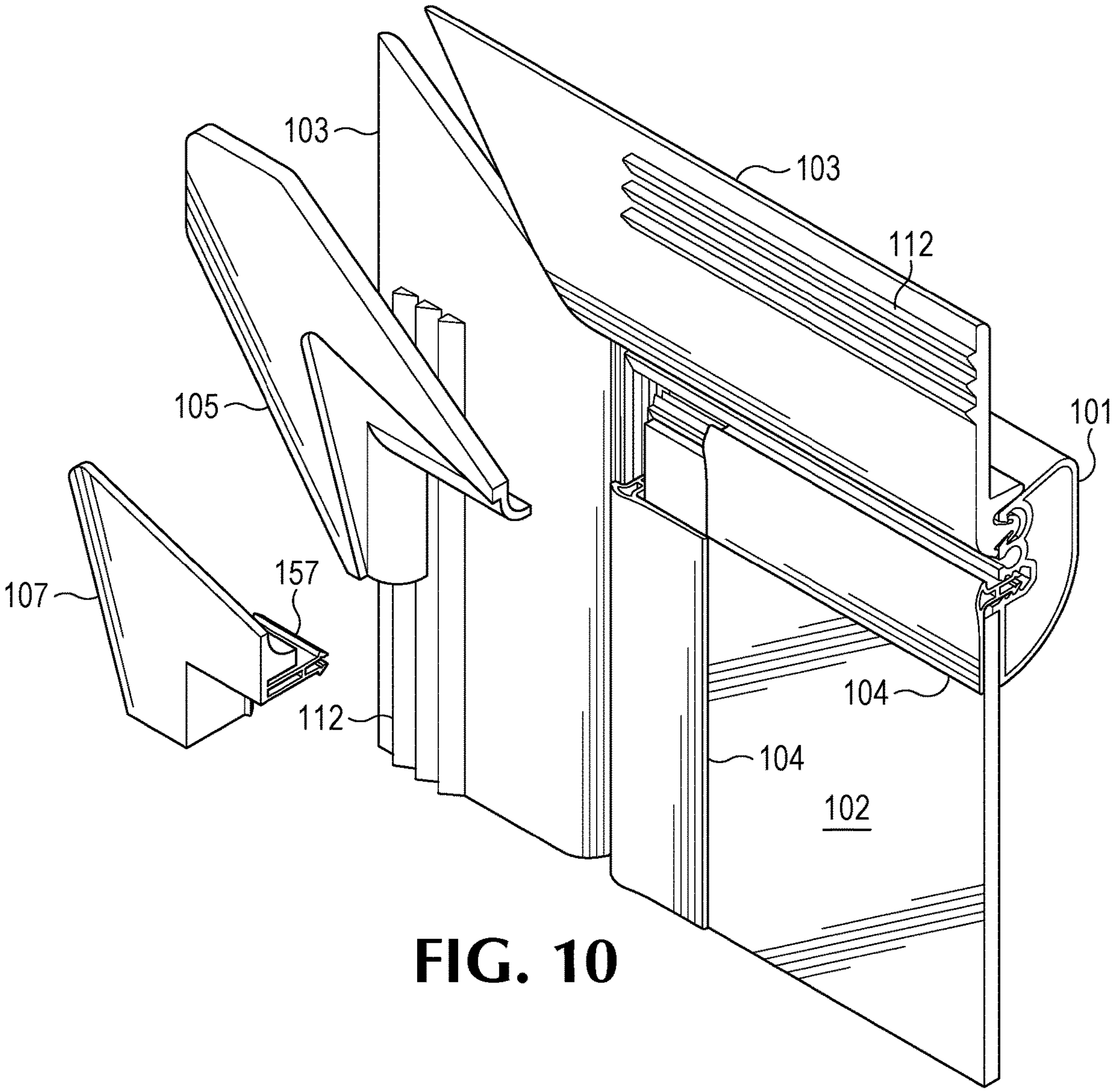
FIG. 10 is an exploded view of a portion of the corner of the press-fit window insert in FIG. 8, illustrating the leaf and the corner snap exploded away from the remainder of the press-fit window insert.
Figure 11:
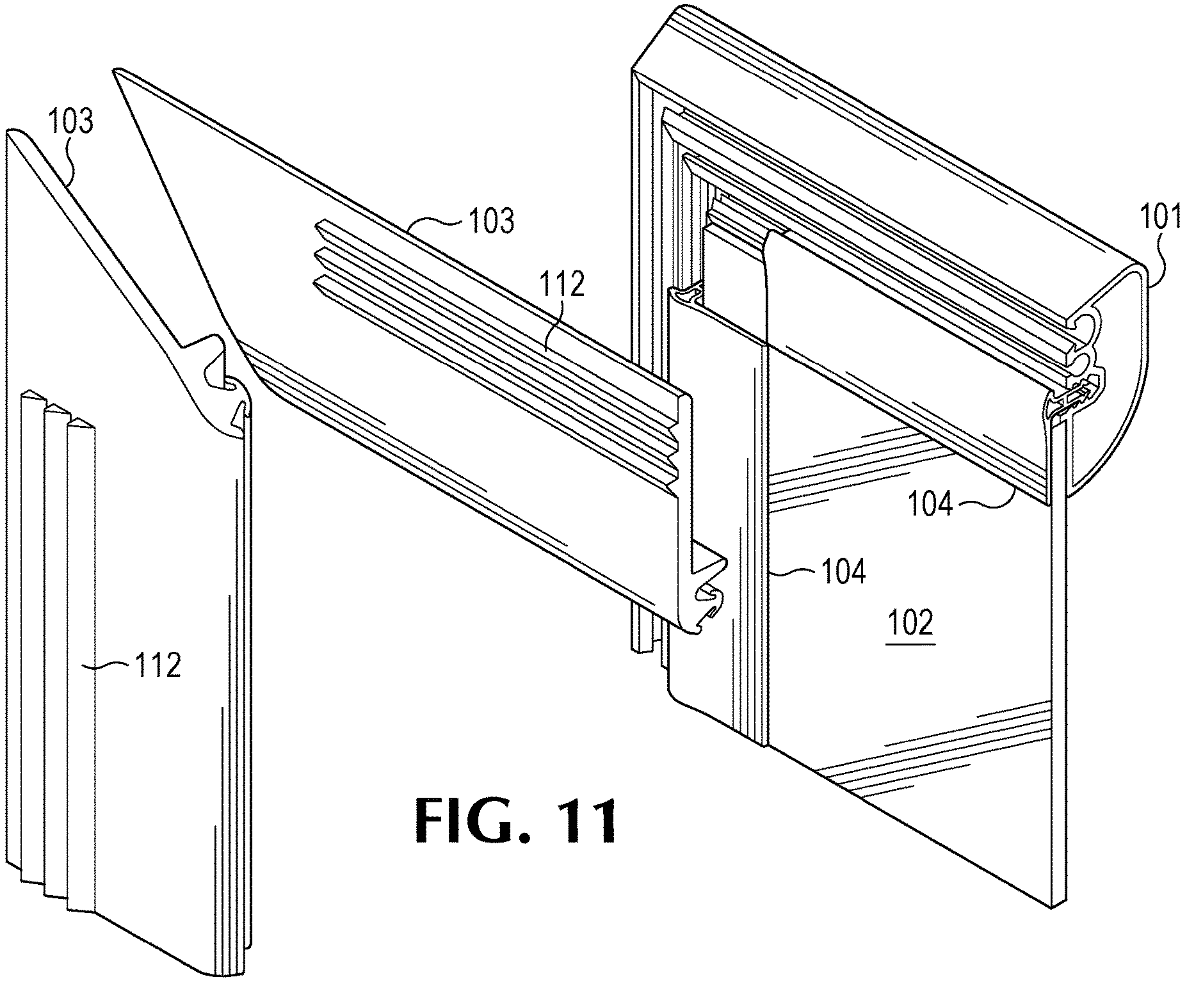
FIG. 11 is an exploded view of a portion of the corner of the press-fit window insert in FIG. 8, illustrating the two fins that meet at the corner exploded away from the remainder of the press-fit window insert and not showing the leaf and the corner snap.

The leaf 105, or corner flap, is shaped and configured to reduce air infiltration where the fin 103 from a first edge 113 of the panel 102 meets the fin 103 from a second edge 114 of the panel 102. As best shown in FIGS. 8 and 10, the leaf 105 may seal the corner of the press-fit window insert 100 by spanning the region, or gap, between the fin 103 from the first edge 113 of the panel 102 and the fin 103 from the second edge 114 of the panel 102. The leaf 105 may overlap one or both of the fin 103 from the first edge 113 of the panel 102 and the fin 103 from the second edge 114 of the panel 102. The leaf 105, being separate from the fins 103, may move relative to and independently from the fins 103 during installation of the press-fit window insert 100 into the window frame 110, thus reducing or preventing bunching of the sealing material (the fins 103 and the leaf 105) at the corners of the press-fit window insert 100. The leaf 105 may be made from, for example, silicone or another resilient elastomer. The leaf 105 may attach to the carrier 101.

Figure 9:
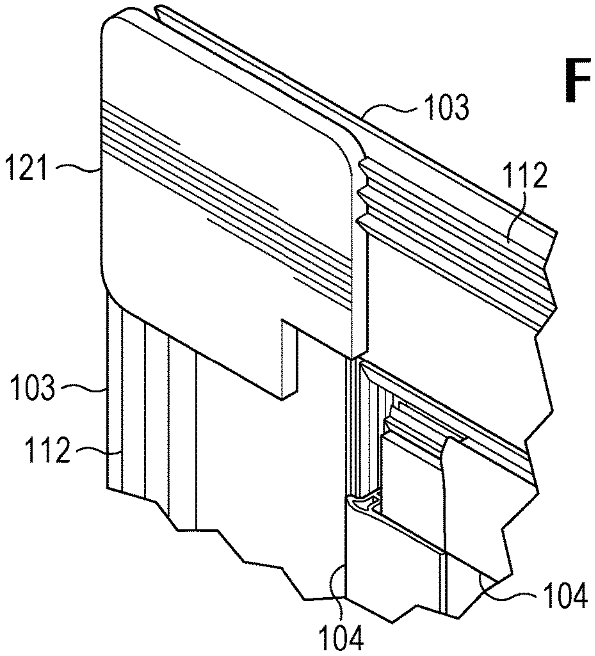
FIG. 9 is a detailed view, similar to FIG. 8, but illustrating a leaf that is glued to one or both fins at a corner of the press-fit window insert.

As illustrated in FIG. 9, in configurations the leaf 121 may be glued to one or both fins 103 meeting at a corner of the press-fit window insert 100. In configurations where the leaf 121 is glued to one of the fins 103, the leaf 121 may move relative to the other fin, allowing the leaf 121 to seal the corner without bunching. In configurations, the leaf 121 may attach to the corner snap 107 via an overmolding process.

Returning to FIGS. 8 and 10, the corner snap 107 is shaped and configured to secure the leaf 105 to the corner piece 106 or to the carrier 101. In configurations, the corner snap 107 may interlock, such as by snap fit, with one or both of the leaf 105 and the corner piece 106 or the carrier 101. In configurations, the corner snap 107 may be glued to one or both of the leaf 105 and the corner piece 106 or the carrier 101. In configurations, the corner snap 107 secures the leaf 105 by pinching the leaf 105 between the corner snap 107 and the carrier 101.

As illustrated in FIG. 4, a press-fit window insert 100 may include a safety chain 116. The safety chain 116 is shaped and configured to tether the press-fit window insert 100 to the window frame 110 in the event that the press-fit window insert 100 becomes inadvertently dislodged from the window frame 110. The safety chain 116 may, for example, attach to the carrier 101 by interlocking with one or more of the channels 109. In configurations, a portion of the safety chain 116, such as one link or ball, may be inserted from an end of the channel 109 and slid down the channel 109 to the desired location. Optionally, the channel 109 may be crimped at the desired location to secure the safety chain 116 at the desired location. In configurations, the safety chain 116 may be glued into the channel 109.

As shown in FIG. 5, the base support 108 is shaped and configured to support the panel 102 against the window frame 110. For example, a relatively heavy panel 102 may need additional support, in which case the base support 108 may partially support the weight of the panel 102 against the window frame 110. In configurations, the base support 108 may help to center the panel 102 within the window frame 110. The base support 108 may be made from, for example, extruded plastic, such as polyvinyl chloride (PVC). In configurations, the press-fit window insert 100 may include multiple sizes of base supports 108 to accommodate various window frames 110. In configurations, the support provided by the base support 108 may also provide more compression of the fin 103, particularly along the top and the bottom of the press-fit window insert 100.

Figure 6:
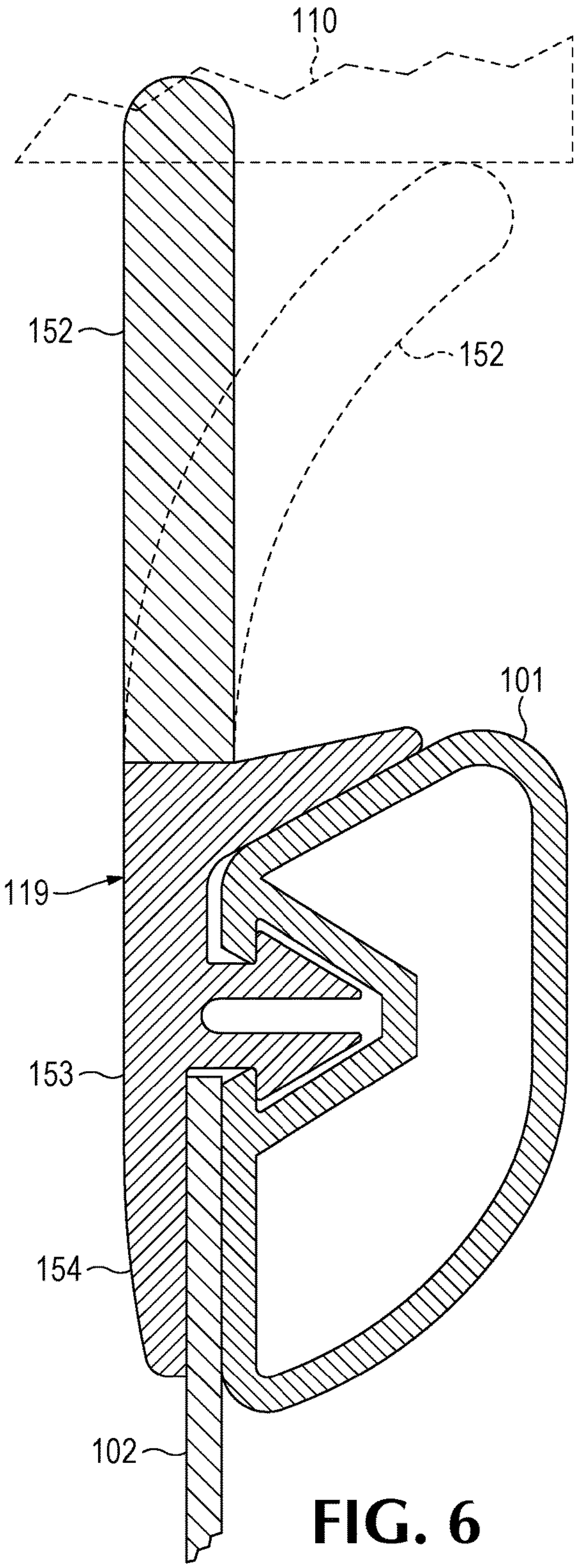
FIG. 6 is a cross-sectional view, similar to FIG. 4, but showing a unitary fin clip as an alternative to a separate fin and fastening clip.

FIG. 6 shows a configuration for a press-fit window insert 100 that is an alternative to what is shown in FIGS. 1-5. In particular, as illustrated in FIG. 6, the fin clip 119 may be a unitary structure that combines the functions described above for the fin 103 and the fastening clip 104. Hence, the fin clip 119 may include a substantially flexible blade 152 extending from a base portion 153 of the fin clip 119 and a substantially rigid brim 154 extending from the base portion 153 of the fin clip 119. The base portion 153 of the fin clip 119 is configured to interlock the fin clip 119 to the carrier 101. The unitary structure may be removed from the carrier 101 in a single piece rather than the two separate pieces illustrated in FIGS. 4-5 and discussed above. The broken lines in FIG. 6 illustrate how the fin clip 119 may deflect when pressed against the window frame 110.

Figure 7:
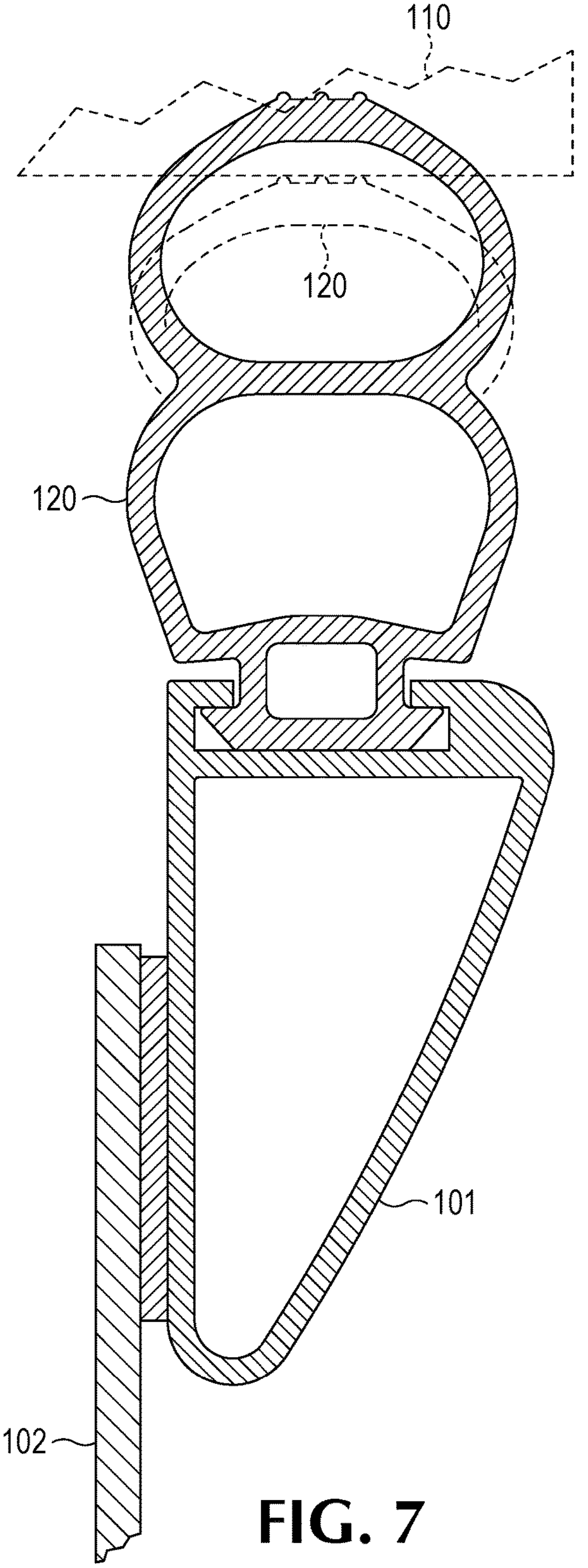
FIG. 7 is a cross-sectional view, similar to FIG. 4, but showing a bulb as an alternative to a fin.

FIG. 7 shows a configuration for a press-fit window insert 100 that is an alternative to what is shown in FIGS. 1-6. In particular, as illustrated in FIG. 7, instead of a fin 103, the press-fit window insert 100 may include a compressible bulb 120. Otherwise, the configuration of FIG. 7 may be substantially the same as what is discussed above for FIGS. 1-6. The broken lines in FIG. 7 illustrate how the compressible bulb 120 may compress when pressed against the window frame 110. As a result of the elastic compression, the bulb 120 is shaped and configured to impart a force to the window frame 110, the force tending to keep the press-fit window insert 100 installed into the window frame 110.

Figure 13:
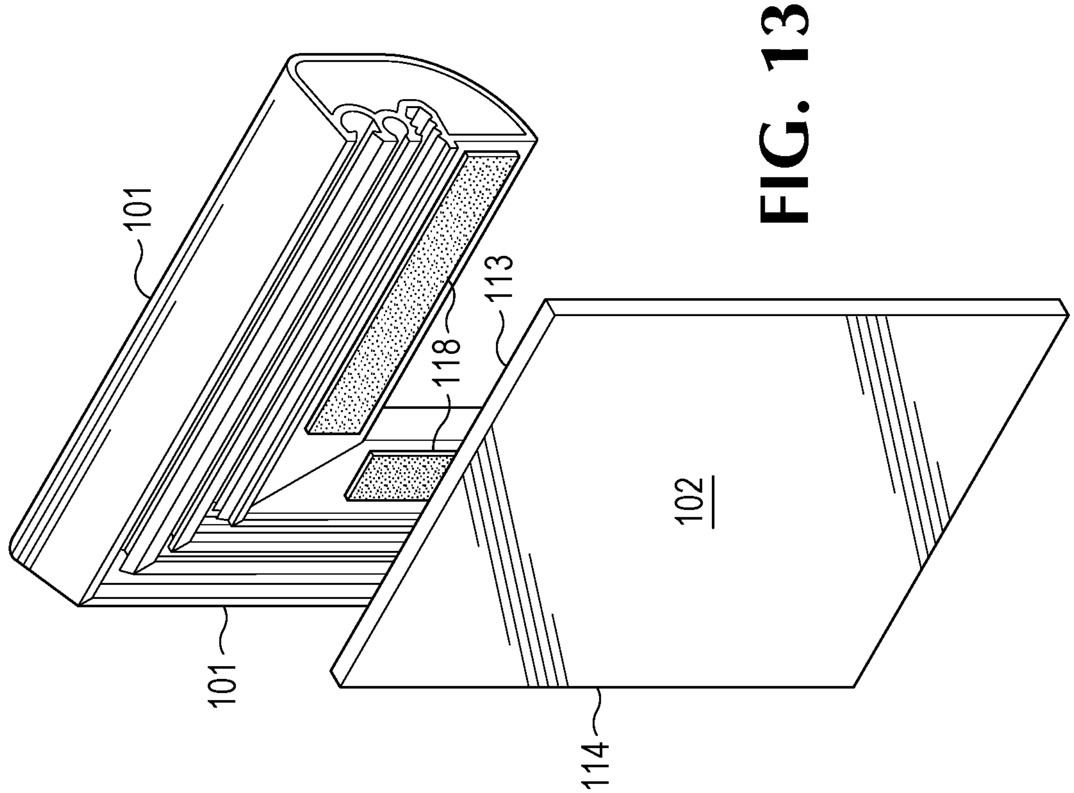
FIG. 13 is a partially exploded view of a corner of a press-fit window insert according to configurations, illustrating an alternative to the configuration illustrated in FIG. 8, in which the press-fit window insert includes an adhesive, in addition to or instead of the fastening clip, to couple the panel to the carrier.
Figure 12:
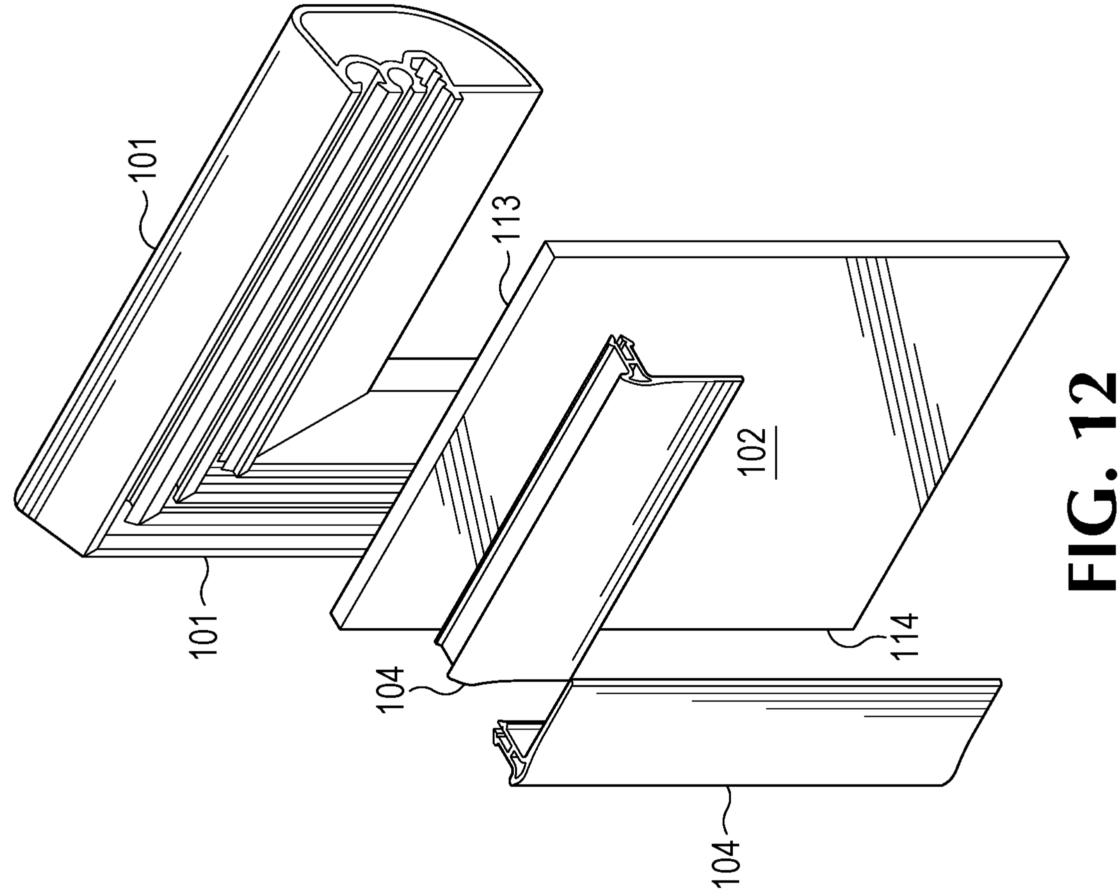
FIG. 12 is an exploded view of a portion of the corner of the press-fit window insert in FIG. 8, illustrating the two fastening clips that meet at the corner exploded away from the remainder of the press-fit window insert and not showing the leaf, the corner snap, or the two fins that meet at the corner.

FIG. 13 shows a configuration for a press-fit window insert 100 that is an alternative to what is shown in the other FIGs. In particular, as illustrated in FIG. 13, the press-fit window insert 100 may include adhesive 118, such as double-sided tape, in addition to or instead of the fastening clip 104, to couple the panel 102 to the carrier 101.

Figure 14:
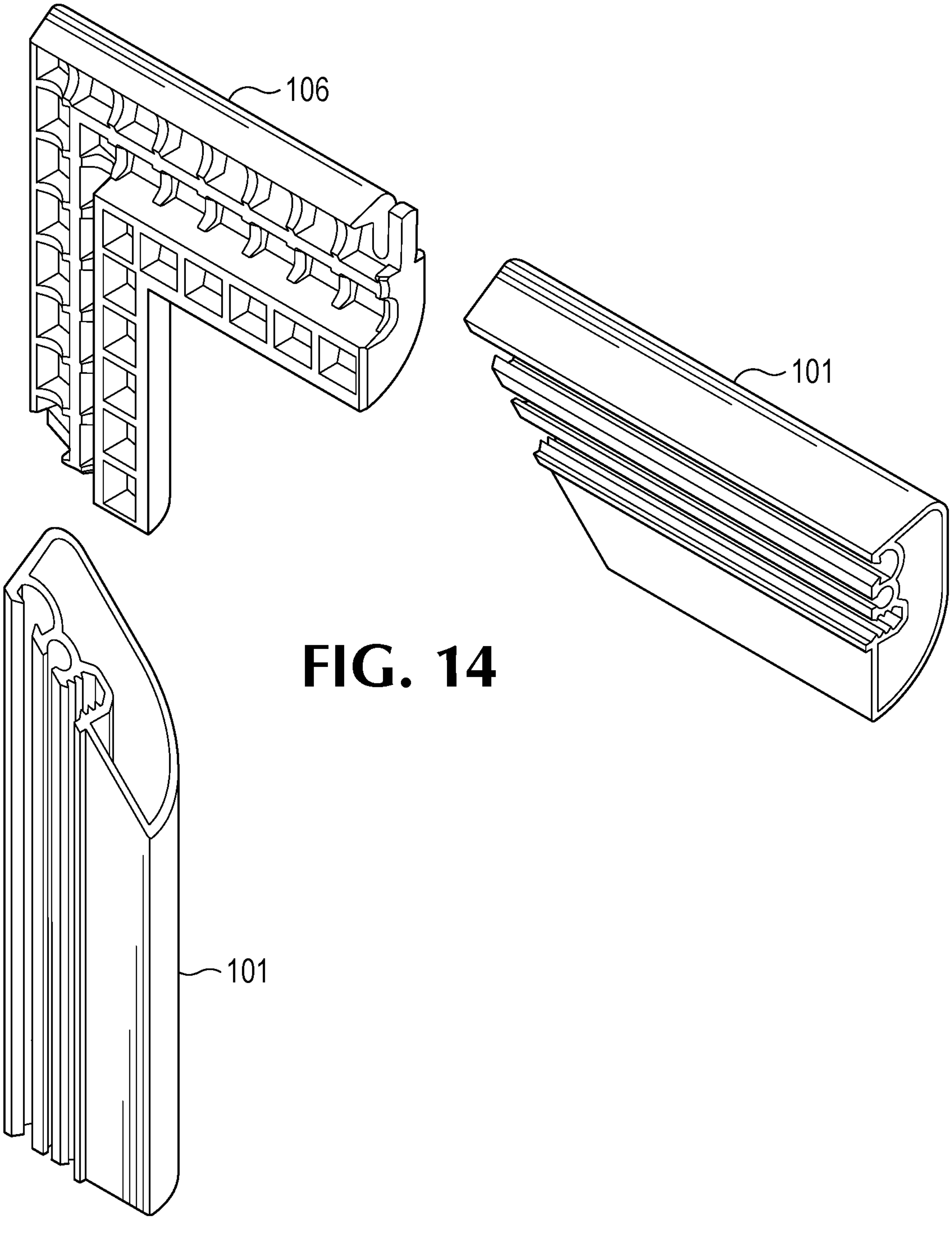
FIG. 14 is an exploded view of a portion of the corner of the press-fit window insert in FIG. 8, illustrating the corner piece and the two carriers that meet at the corner and not illustrating the remainder of the press-fit window insert.

As best shown in FIG. 14, the corner piece 106 is shaped and configured to increase the strength of the press-fit window insert 100, particularly at the corners of the press-fit window insert 100. The corner piece 106 may connect the carrier 101 from the first edge 113 of the panel 102 (i.e. the first carrier section) to the carrier 101 from the second edge 114 of the panel 102 (i.e. the second carrier section) at an angle less than 180 degrees. As illustrated the angle is about 90°, though other angles could be used where the press-fit window insert 100 is not rectangular. The corner piece 106 may be made from, for example, molded plastic.

FIGS. 15-22 illustrate alternatives or variations to some of the features discussed above.

Figure 15:
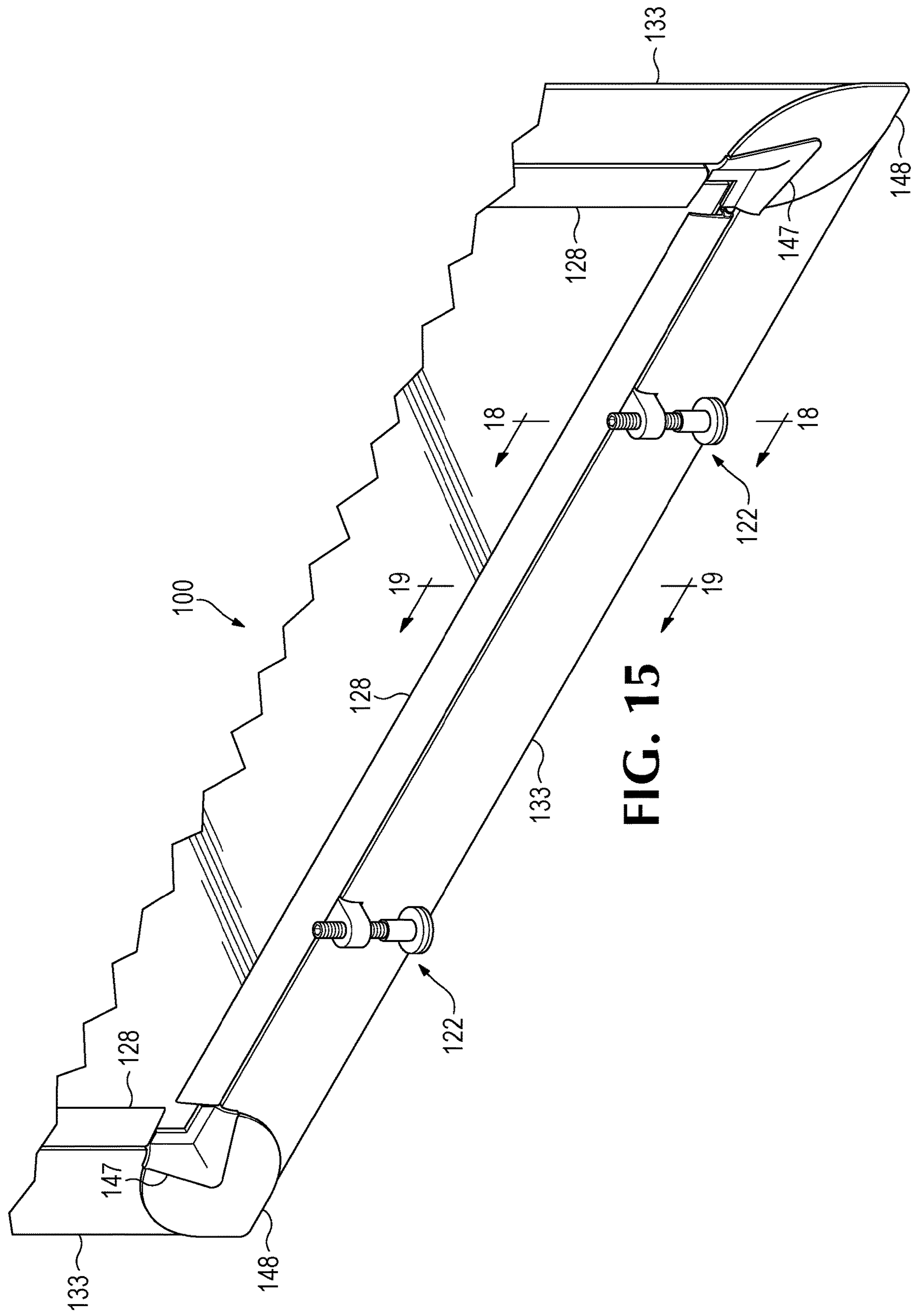
FIG. 15 is a cutaway isometric view of a press-fit window insert according to configurations. The view in FIG. 15 is similar to the view of FIG. 3 but shows alternatives or variations to some of the features illustrated in FIGS. 1-14.
Figure 16:
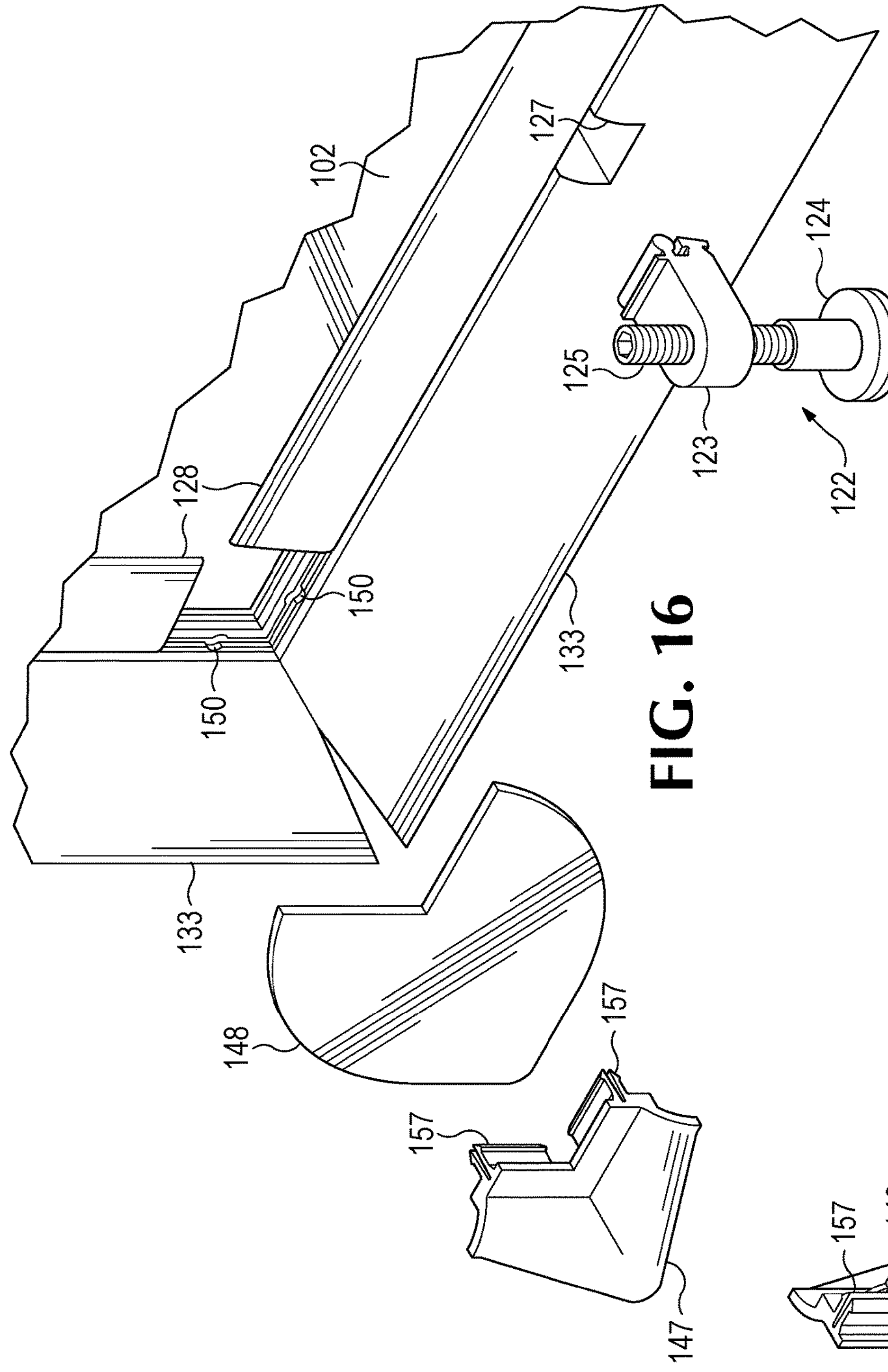
FIG. 16 is a detail view of a portion of the press-fit window insert of FIG. 15, showing an example of a corner snap and an example of a leaf in exploded view.
Figure 18:
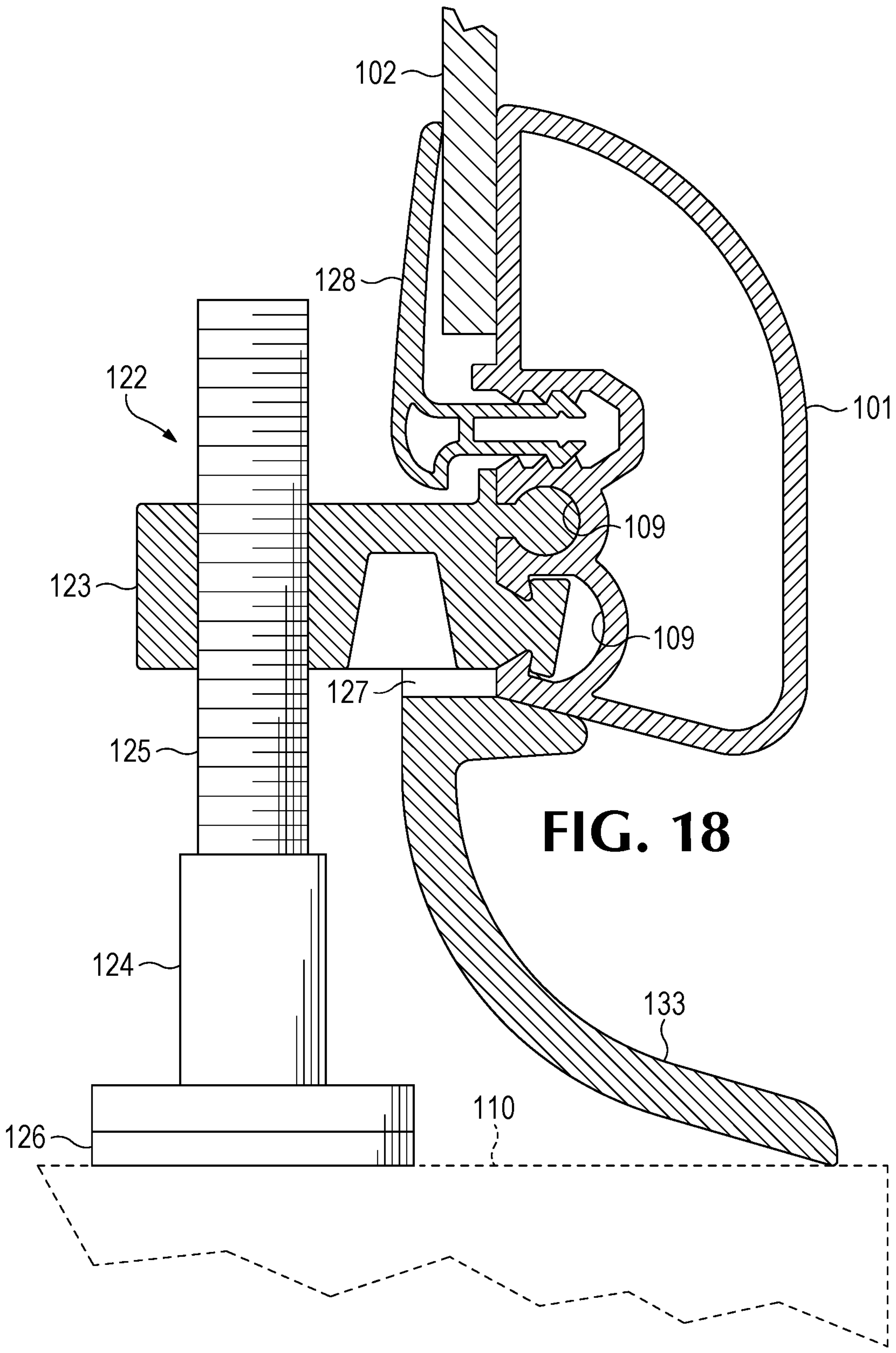
FIG. 18 is a sectional view as defined in FIG. 15.

FIGS. 15, 16, and 18 show an alternative version of the base support 108. As illustrated in FIGS. 15, 16, and 18, a base support 122 is shaped and configured to support the panel 102 against the window frame 110. The base support 122 may include a support clip 123 and a foot member 124.

The support clip 123 is configured to couple to the carrier 101. For example, the support clip 123 may interconnect with one or more channels 109 in the carrier 101. Such interconnection may be, for example, by sliding or pressing a portion of the support clip 123 into the channels 109. In configurations, the support clip 123 interconnects with at least two channels 109 in the carrier 101 to provide additional stability over what one point of contact would provide. The fin 103 may include a notch 127 to accommodate the base support 122 and allow the support clip 123 to couple to the carrier 101.

The foot member 124 is configured to rest on the window frame 110 and, thereby, transfer a portion of the weight of the panel 102 to the window frame 110. The foot member 124 may include a foot pad 126 to help prevent scratches and other damage to the window frame 110. The foot pad 126 may be, for example, a felt pad.

In the illustrated configuration, the foot member 124 and the support clip 123 are coupled together through an adjustment mechanism 125. The adjustment mechanism 125 may be configured to adjust the height of the support clip 123 above the window frame 110. As best shown in FIG. 16, in configurations the adjustment mechanism 125 is threaded and the height of the support clip 123 above the window frame 110 may be adjusted by, for example, turning the adjustment mechanism 125 to allow the support clip 123 to move up or down on the threads of the adjustment mechanism 125.

Figure 17:
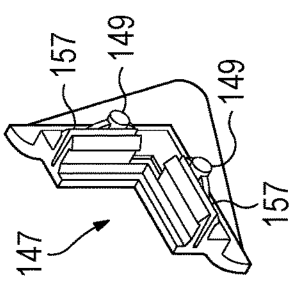
FIG. 17 is an isometric view of the opposite side of the corner snap of FIG. 16.

FIGS. 15-17 show alternative versions of the corner snap 107 and the corner flap, or leaf, 105 discussed above with regard to FIG. 10. FIG. 15 is a cutaway isometric view of a press-fit window insert 100 according to configurations. The view in FIG. 15 is similar to the view of FIG. 3. FIG. 16 is a detail view of a portion of the press-fit window insert 100 of FIG. 15. FIG. 17 is an isometric view of the opposite side of the corner snap of FIG. 16.

As illustrated in FIGS. 15-17, a corner flap, or leaf, 148 is configured to overlay a gap between a first fin 133 and an adjacent, second fin 133 at a corner of the press-fit window insert 100. The corner flap 148 overlaps a portion of the first fin 133 and a portion of the second fin 133 at the corner of the press-fit window insert 100. As described above for the leaf 105, the corner flap 148 is shaped and configured to reduce air infiltration at the gap where the first fin 133 meets the second fin 133.

The corner snap 147 is shaped and configured to secure the leaf 148 to the carrier 101. For example, the corner snap 147 may pinch the leaf 148 between the corner snap 147 and the carrier 101. The corner snap 147 may interlock, such as by snap fit, with the carrier 101. For example, the corner snap 147 may include pins 149 that fit into corresponding holes 150 on the carrier 101. In such configurations, when the pins 149 are fitted into the holes 150, the configuration helps to hold the press-fit window insert 100 together. In addition, or instead, the corner snap 147 may include prongs 157. The prongs 157 are resilient and configured to interlock with channels 109 in the carrier 101, allowing the corner snap 147 (and, thus, also the leaf 148) to be coupled to the carrier 101. Although shown and described with regard to the fin 133, the corner flap 148 and the corner snap 147 may be used with any of the fin designs described in this disclosure.

Figure 23:
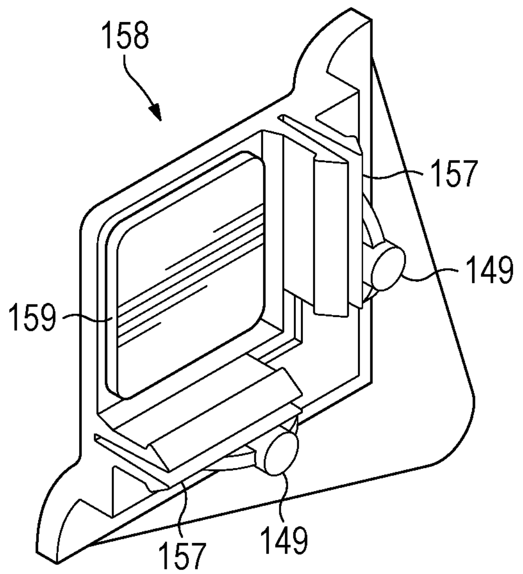
FIG. 23 is an isometric view of an example of a corner snap.

FIG. 23 shows an alternative version of the corner snap 147 of FIGS. 15-17. The corner snap 158 of FIG. 23 is as discussed above for the corner snap 147 of FIGS. 15-17 except as noted here. As illustrated in FIG. 23, the corner snap 158 may include a seal pad 159. The seal pad 159 is configured to seal between the fastening clip 104, 128, 129 and the panel 102.

FIGS. 19 and 20 show alternative versions of the fastening clip 104. As illustrated in FIG. 19, a fastening clip 128 is shaped and configured to pinch an edge of the panel 102 against the carrier 101. Likewise, as illustrated in FIG. 19, a fastening clip 129 is shaped and configured to pinch an edge of the panel 102 against the carrier 101. In addition to what is described above for the fastening clip 104 of FIGS. 4,5,11, and 12, the fastening clip 104, the fastening clip 128 of FIG. 19, and the fastening clip 129 of FIG. 20 may each include a bridge 130 that spans prongs 131. The prongs 131 are resilient and configured to interlock with channels 109 in the carrier 101, allowing the fastening clip 104, 128, 129 to be coupled to the carrier 101. The bridge 130 is configured and positioned to provide stiffness to the prongs 131, helping to prevent accidental removal of the prongs 131 from the channel 109 while still permitting a user to use thumb pressure to press the prongs 131 into the channel 109. A thumb-pad portion 132 of the fastening clip 104, 128, 129 provides a visual target for where the user may press on the fastening clip to couple to fastening clip to the carrier 101.

The fastening clip 128 of FIG. 19 is configured to accommodate a panel 102 that is relatively thin, and fastening clip 129 of FIG. 20 is configured to accommodate a panel 102 that is relatively thicker than what is illustrated in FIG. 19. A relatively thin panel 102 may have a width up to about ⅛ inch, while a relatively thick panel 102 may have a width over about ¼ inch.

FIGS. 19-21 show alternative versions of the fin 103 discussed above for FIGS. 4 and 5. The fin 133 of FIG. 19, the fin 134 of FIG. 20, and the fin 135 of FIG. 21 have the features described above for the fin 103 of FIGS. 4 and 5 except as noted here.

As illustrated in FIG. 19, the fin 133 the arrowhead tip 136 may be asymmetrical. A large barb 137 of the asymmetrical arrowhead tip 136 is larger in size than a smaller barb 137 of the asymmetrical arrowhead tip 136. Preferably, the large barb 137 is between about 20 percent and about 200 percent bigger than the smaller barb. More preferably, the large barb 137 is between about 50 percent and about 150 percent bigger than the smaller barb. Even more preferably, the large barb 137 is about twice the size of the smaller barb 137.

The larger barb 137 is on a side of the asymmetrical arrowhead tip 136 that is closer to a long lobe 139 of the fin 133. The smaller barb 138 is on a side of the asymmetrical arrowhead tip 136 that is closer to a short lobe 140 of the fin 133.

The asymmetrical arrowhead tip 136 may provide the advantage of allowing maximal material to fit into the channel 109 of the carrier 101 with minimal resistance. Additionally, the asymmetrical arrowhead tip 136 better resists (as compared to a symmetrical arrowhead tip) being removed from the channel 109 of the carrier 101 when the user removes the press-fit window insert 100 from the window frame 110. In addition, each of the long lobe 139 and the short lobe 140 contacts, and provides leverage against, the carrier 101 to further resist removal of the asymmetrical arrowhead tip 136 from the channel 109 of the carrier 101 when the user removes the press-fit window insert 100 from the window frame 110.

As illustrated in FIG. 19, the ribs 112 discussed above for FIG. 4, are not included in all configurations of the fin 133 of FIG. 19. Although the fastening clip 128 is illustrated in FIG. 19 along with the fin 133, the fastening clip 128 and the fin 133 need not always be used together in every configuration. There are alternatives to each of those components as discussed in this disclosure.

The fin 134 of FIG. 20 is as discussed above for the fin 133 of FIG. 19 except as noted here. Specifically, as shown in FIG. 20, a blade 152 of the fin 134 may be pre-bent, such that there is an angle of less than 90° between the blade 152 and a vertical datum 142 of the fin 134. Preferably, the angle 143 between the blade 152 and the vertical datum 142 of the fin 134 is between about 10° and about 50°. More preferably, the angle 143 is between about 20° and about 40°. Even more preferably, the angle 143 is about 30°. The vertical datum 142 represents a vertical direction in a typical installation of a press-fit window insert 100 into a window frame 110. The vertical datum 142 is substantially parallel to the panel 102 as shown, for example, in FIG. 20. As used in this disclosure, "substantially parallel" means largely or essentially equidistant at all points, without requiring perfect parallelism. As illustrated in FIG. 20, a root portion 151 of the blade 152 may be substantially parallel to, or may coincide with, the vertical datum 142. Accordingly, blade 152 of the fin 134 is pre-bent in an unstressed condition, meaning that there are no significant forces being applied to the blade 152 of the fin 134 other than perhaps gravity.

By contrast, the corresponding angle for the fin 133 of FIG. 19 is about 90°, making the blade 152 of the fin 133 of FIG. 19 straight in the unstressed condition where there are no significant forces being applied to the blade 152 of the fin 133 other than perhaps gravity.

A pre-bent fin 134 may provide the advantage of being able to fit into more limited window frame space than a fin that is not pre-bent. For example, blinds are often installed in a window frame, and blinds reduce the amount of space that would otherwise be available to install the press-fit window insert 100 in the window frame 110. The pre-bent fin 134 may be easier to install between blinds and the primary window 115.

Although the fastening clip 129 is illustrated in FIG. 20 along with the fin 134, the fastening clip 129 and the fin 134 need not always be used together in every configuration. There are alternatives to each of those components as discussed in this disclosure.

The fin 135 of FIG. 21 is as discussed above for the fin 133 of FIG. 19 and the fin 134 of FIG. 20, except as noted here. Specifically, as shown in FIG. 21, the arrowhead tip 136 may be enlarged. As illustrated, the enlarged arrowhead tip 144 is configured so that it cannot be pressed into the channel 109 of the carrier 101 under normal operating conditions (meaning thumb pressure from a human user). Instead, the enlarged arrowhead tip 144 is slid into an open end of the channel 109. Accordingly, the enlarged arrowhead tip 144 substantially prevents removal of the fin 135 from the channel 109 of the carrier 101 when the user removes the press-fit window insert 100 from the window frame 110. As used in this disclosure, "substantially prevent" means largely or essentially hindering, without requiring perfect avoidance of all occurrences.

Figure 22:
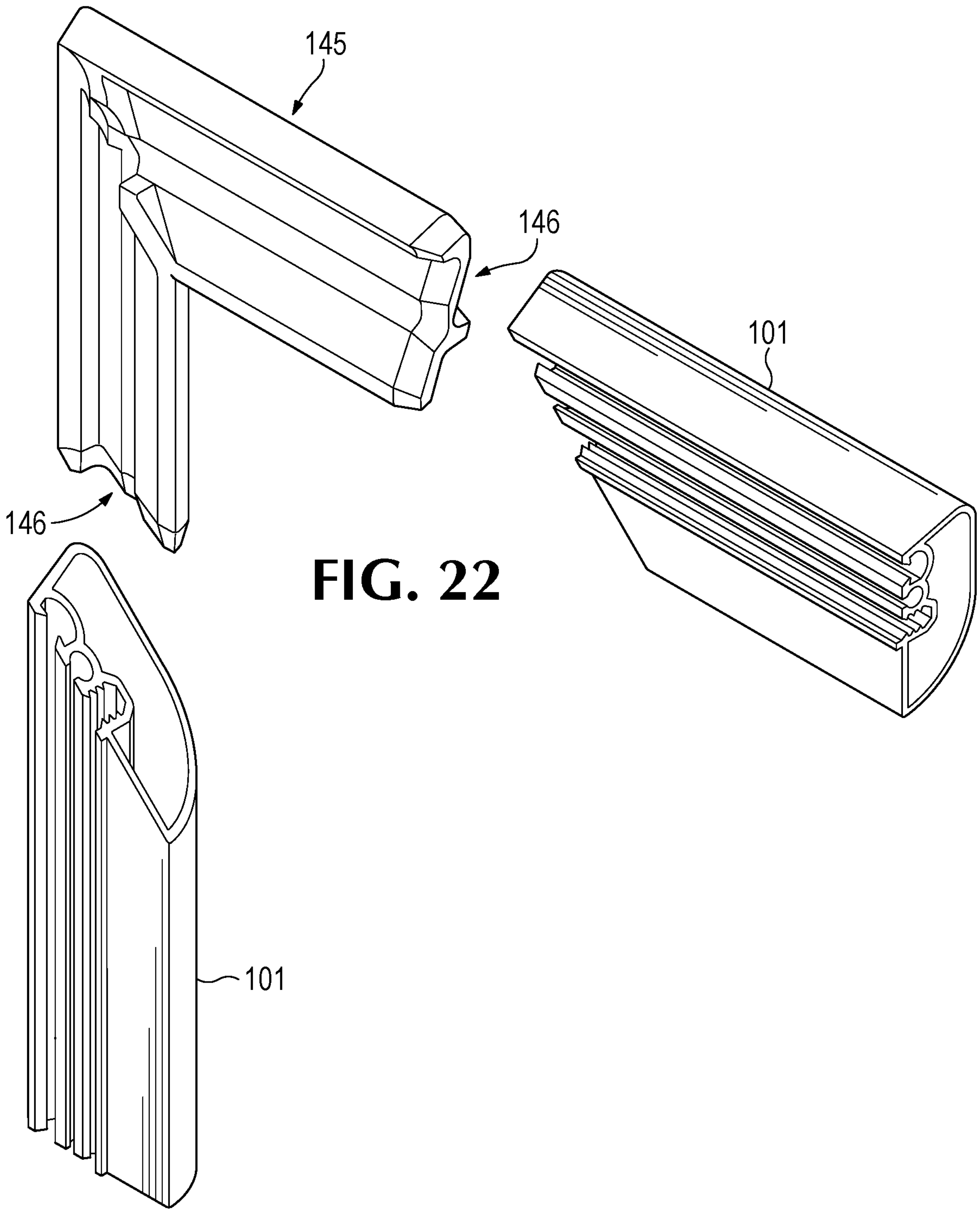
FIG. 22 is similar to the view of FIG. 14 but shows alternatives or variations to some of the features illustrated in FIG. 14.

FIG. 22 shows an alternative to the corner piece 106 discussed above for FIG. 14. The corner piece 145 of FIG. 22 is as discussed above for the corner piece 106 of FIG. 14 except as noted here. In particular, corner piece 145 includes tapered edges, or ramps, 146 as indicated in FIG. 22 to facilitate insertion of the corner piece 145 into the carrier 101.

Accordingly, configurations of the technology disclosed here allow less precise measurements to be made of the window frame, while still providing a proper fit with the window frame, even on window frames that are out of square. This is because the deflection of the fin in configurations (or the compression of the bulb in configurations) may absorb the out-of-square condition and the measurement error. All the while, the unique corner configuration of the leaf accommodates the deflection of the fin (or the compression of the bulb) to provide an air seal at the corners of the press-fit window insert. Hence, a consumer, such as a homeowner, may measure the existing window frame and install the press-fit window insert themselves without requiring professional assistance or a laser measurement device.

Furthermore, configurations of the press-fit window insert are designed to provide sufficient friction to hold the press-fit window insert in place across a wide range of compressions. For instance, in configurations the fin is shaped and configured to resist air pressure when only lightly compressed, at about ⅛ inch. Configurations of the fin are also shaped and configured to resist air pressure at a maximum compression of about ⅞ inch. In configurations, the fin is shaped and configured to be removable from the window frame under maximum compression.

EXAMPLES

Illustrative examples of the disclosed technologies are provided below. A particular configuration of the technologies may include one or more, and any combination of, the examples described below.

Example 1 includes a press-fit window insert configured to provide secondary protection to an existing window, the window insert comprising: a carrier comprising a substantially rigid framework having a first channel and a second channel within the framework, the first channel and the second channel each being configured to securely accept one or more attachments; a fin extending from the carrier, the fin comprising a substantially flexible blade extending from a base portion of the fin, the base portion of the fin being configured to interlock the fin to the carrier; and a fastening clip, the fastening clip comprising a substantially rigid brim extending from a base portion of the fastening clip, the base portion of the fastening clip being configured to interlock the fastening clip to the carrier.

Example 2 includes the window insert of Example 1, further comprising a panel substantially surrounded by one or more segments of the carrier, the fastening clip pinching an edge of a panel against a surface of the carrier.

Example 3 includes the window insert of Example 2, in which the panel comprises one of glass, a polycarbonate, and acrylic, a fiberboard, a film, a laminate layer, and a screen.

Example 4 includes the window insert of any of Examples 2-3, further comprising adhesive to couple the panel to the carrier.

Example 5 includes the window insert of any of Examples 1-4, in which the base portion of the fin includes an arrowhead tip configured to extend into the first channel through a slot in the carrier to interlock the fin to the carrier.

Example 6 includes the window insert of Example 5, in which the arrowhead tip is asymmetrical, the asymmetrical arrowhead tip comprising a first barb and a second barb, the first barb being larger than the smaller barb.

Example 7 includes the window insert of Example 5, in which the arrowhead tip is enlarged, the enlarged arrowhead tip being small enough to fit within the first channel, the enlarged arrowhead tip being too large to be pressed through the slot and into the first channel.

Example 8 includes the window insert of any of Examples 1-7, in which the blade of the fin is substantially straight in an unstressed condition.

Example 9 includes the window insert of any of Examples 1-7, in which the blade of the fin is pre-bent in unstressed condition.

Example 10 includes the window insert of any of Examples 1-9, in which the base portion of the fastening clip includes a pair of resilient prongs configured to interlock the fastening clip to the carrier.

Example 11 includes the window insert of Example 10, the base portion of the fastening clip further including a bridge spanning between the pair of resilient prongs, the bridge configured to provide stiffness to the pair of prongs.

Example 12 includes the window insert of any of Examples 1-11, further comprising a corner flap configured to overlay a gap between a first fin and an adjacent, second fin at a corner of the window insert, the corner flap further configured to overlap a portion of the first fin and a portion of the second fin at the corner of the window insert.

Example 13 includes the window insert of Example 12, further comprising a corner snap configured to secure the corner flap to the carrier by pinching the corner flap between the corner snap and the carrier.

Example 14 includes the window insert of any of Examples 1-13, further comprising a corner piece to connect a first carrier section to an adjacent, second carrier section, the corner piece connecting the first carrier section to the second carrier section at an angle less than 180 degrees, the corner piece configured to slide into each of the first carrier section and the second carrier section.

Example 15 includes the window insert of any of Examples 1-14, further comprising a pull ring configured to facilitate removal of the window insert from a window frame.

Example 16 includes the window insert of any of Examples 1-15, further comprising a safety chain configured to interlock with the carrier, the safety chain further configured to tether the window insert to a window frame.

Example 17 includes a press-fit window insert configured to provide secondary protection to an existing window, the window insert comprising: a carrier comprising a substantially rigid framework having a channel within the framework, the channel being configured to securely accept one or more attachments; and a fin clip extending from the carrier, the fin clip comprising a substantially flexible blade extending from a base portion of the fin clip, the base portion of the fin clip being configured to interlock the fin clip to the carrier, the fin clip further comprising a substantially rigid brim extending from the base portion of the fin clip.

Example 18 includes the window insert of Example 17, further comprising a panel substantially surrounded by one or more segments of the carrier, the fin clip pinching an edge of a panel against a surface of the carrier.

Example 19 includes the window insert of Example 18, in which the panel comprises one of glass, a polycarbonate, and acrylic, a fiberboard, a film, and a screen.

Example 20 includes the window insert of any of Examples 17-19, in which the base portion of the fin clip includes an arrowhead tip configured to extend into the channel through a slot in the carrier to interlock the fin clip to the carrier.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular example configuration, that feature can also be used, to the extent possible, in the context of other example configurations.

Furthermore, the term “comprises” and its grammatical equivalents are used in this application to mean that other components, features, steps, processes, operations, etc. are optionally present. For example, an article “comprising” or “which comprises” components A, B, and C can contain only components A, B, and C, or it can contain components A, B, and C along with one or more other components.

Also, directions such as “vertical,” “horizontal,” “right,” and “left” are used for convenience and in reference to the views provided in figures. But the press-fit window insert may have a number of orientations in actual use. Thus, a feature that is vertical, horizontal, to the right, or to the left in the figures may not have that same orientation or direction in actual use.

Although specific example configurations have been described for purposes of illustration, it will be understood that various modifications may be made without departing from the spirit and scope of the disclosure.

We claim:

1. A press-fit window insert configured to provide secondary protection to an existing window, the window insert comprising:

a carrier comprising a substantially rigid framework having a first channel and a second channel within the framework, the first channel and the second channel each being configured to securely accept one or more attachments;

a fin extending from the carrier and configured to provide an air seal between the carrier and a frame of the existing window, the fin comprising a substantially flexible blade extending from a base portion of the fin, the base portion of the fin being configured to interlock the fin to the carrier; and a fastening clip, the fastening clip comprising a substantially rigid brim extending from a base portion of the fastening clip, the base portion of the fastening clip being configured to interlock the fastening clip to the carrier; and a panel substantially surrounded by one or more segments of the carrier, the fastening clip pinching an edge of the panel against a surface of the carrier.

2. The window insert of claim 1, in which the panel comprises one of glass, a polycarbonate, and acrylic, a fiberboard, a film, a laminate layer, and a screen.

3. The window insert of claim 1, further comprising adhesive to couple the panel to the carrier.

4. The window insert of claim 1, in which the base portion of the fin includes an arrowhead tip configured to extend into the first channel through a slot in the carrier to interlock the fin to the carrier.

5. The window insert of claim 4, in which the arrowhead tip is asymmetrical, the asymmetrical arrowhead tip comprising a first barb and a second barb, the first barb being larger than the smaller barb.

6. The window insert of claim 4, in which the arrowhead tip is enlarged, the enlarged arrowhead tip being small enough to fit within the first channel, the enlarged arrowhead tip being too large to be pressed through the slot and into the first channel.

7. The window insert of claim 1, in which the blade of the fin is substantially straight in an unstressed condition.

8. The window insert of claim 1, in which the blade of the fin is pre-bent in unstressed condition.

9. The window insert of claim 1, in which the base portion of the fastening clip includes a pair of resilient prongs configured to interlock the fastening clip to the carrier.

10. The window insert of claim 9, the base portion of the fastening clip further including a bridge spanning between the pair of resilient prongs, the bridge configured to provide stiffness to the pair of prongs.

11. The window insert of claim 1, further comprising a corner flap configured to overlay a gap between a first fin and an adjacent, second fin at a corner of the window insert, the corner flap further configured to overlap a portion of the first fin and a portion of the second fin at the corner of the window insert.

12. The window insert of claim 11, further comprising a corner snap configured to secure the corner flap to the carrier by pinching the corner flap between the corner snap and the carrier.

13. The window insert of claim 1, further comprising a corner piece to connect a first carrier section to an adjacent, second carrier section, the corner piece connecting the first carrier section to the second carrier section at an angle less than 180 degrees, the corner piece configured to slide into each of the first carrier section and the second carrier section.

14. The window insert of claim 1, further comprising a pull ring configured to facilitate removal of the window insert from a window frame.

15. The window insert of claim 1, further comprising a safety chain configured to interlock with the carrier, the safety chain further configured to tether the window insert to a window frame.

16. A press-fit window insert configured to provide secondary protection to an existing window, the window insert comprising:

a carrier comprising a substantially rigid framework having a channel within the framework, the channel being configured to securely accept one or more attachments; and a fin clip extending from the carrier configured to provide an air seal between the carrier and a frame of the existing window, the fin clip comprising a substantially flexible blade extending from a base portion of the fin clip, the base portion of the fin clip being configured to interlock the fin clip to the carrier, the fin clip further comprising a substantially rigid brim extending from the base portion of the fin clip; and a panel substantially surrounded by one or more segments of the carrier, the fin clip pinching an edge of the panel against a surface of the carrier.

17. The window insert of claim 16, in which the panel comprises one of glass, a polycarbonate, and acrylic, a fiberboard, a film, and a screen.

18. The window insert of claim 16, in which the base portion of the fin clip includes an arrowhead tip configured to extend into the channel through a slot in the carrier to interlock the fin clip to the carrier.

19. A press-fit window insert configured to provide secondary protection to an existing window, the window insert comprising:

a carrier comprising a substantially rigid framework having a first channel and a second channel within the framework, the first channel and the second channel each being configured to securely accept one or more attachments;

a fin extending from the carrier and configured to provide an air seal between the carrier and a frame of the existing window, the fin comprising a substantially flexible blade extending from a base portion of the fin, the base portion of the fin being configured to interlock the fin to the carrier, the base portion including an arrowhead tip configured to extend into the first channel through a slot in the carrier to interlock the fin to the carrier, in which the arrowhead tip is asymmetrical and comprises a first barb and a second barb, the first barb being larger than the smaller barb; and a fastening clip, the fastening clip comprising a substantially rigid brim extending from a base portion of the fastening clip, the base portion of the fastening clip being configured to interlock the fastening clip to the carrier.

20. A press-fit window insert configured to provide secondary protection to an existing window, the window insert comprising:

a carrier comprising a substantially rigid framework having a first channel and a second channel within the framework, the first channel and the second channel each being configured to securely accept one or more attachments;

a fin extending from the carrier and configured to provide an air seal between the carrier and a frame of the existing window, the fin comprising a substantially flexible blade extending from a base portion of the fin, the base portion of the fin being configured to interlock the fin to the carrier;

a fastening clip, the fastening clip comprising a substantially rigid brim extending from a base portion of the fastening clip, the base portion of the fastening clip being configured to interlock the fastening clip to the carrier;

a corner flap configured to overlay a gap between a first fin and an adjacent, second fin at a corner of the window insert, the corner flap further configured to overlap a portion of the first fin and a portion of the second fin at the corner of the window insert; and a corner snap configured to secure the corner flap to the carrier by pinching the corner flap between the corner snap and the carrier.

* * * * *